US012385224B2

(12) United States Patent
Naruo

(10) Patent No.: US 12,385,224 B2
(45) Date of Patent: Aug. 12, 2025

(54) WHEELED CONSTRUCTION MACHINE

(71) Applicant: Hitachi Construction Machinery Co., Ltd., Tokyo (JP)

(72) Inventor: Naoki Naruo, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/849,681

(22) PCT Filed: Feb. 16, 2023

(86) PCT No.: PCT/JP2023/005615
§ 371 (c)(1),
(2) Date: Sep. 23, 2024

(87) PCT Pub. No.: WO2023/188963
PCT Pub. Date: Oct. 5, 2023

(65) Prior Publication Data

US 2025/0198122 A1 Jun. 19, 2025

(30) Foreign Application Priority Data

Mar. 31, 2022 (JP) ................................ 2022-059599

(51) Int. Cl.
*E02F 9/22* (2006.01)
*F15B 21/08* (2006.01)

(52) U.S. Cl.
CPC .......... *E02F 9/2207* (2013.01); *E02F 9/2264* (2013.01); *F15B 21/087* (2013.01);
(Continued)

(58) Field of Classification Search
CPC ..... E02F 9/2207; E02F 9/2264; E02F 9/2228; F15B 21/087; F15B 2211/45;
(Continued)

(56) References Cited

U.S. PATENT DOCUMENTS 6,922,923 B2 * 8/2005 Kondou ................ E02F 9/2292
91/451
7,197,872 B2 * 4/2007 Satake .................... F15B 11/20
91/445
(Continued)

FOREIGN PATENT DOCUMENTS

EP 1 541 773 A2 6/2005
JP 3-244720 A 10/1991
(Continued)

OTHER PUBLICATIONS

International Preliminary Report on Patentability (PCT/IB/338 & PCT/IB/373) issued in PCT Application No. PCT/JP2023/005615 dated Oct. 10, 2024, including English translation of Written Opinion (PCT/ISA/237) (6 pages).
(Continued)

*Primary Examiner* — Dustin T Nguyen
(74) *Attorney, Agent, or Firm* — Crowell & Moring LLP

(57) ABSTRACT

A controller of a wheeled hydraulic excavator executes control of a vibration suppression function to control the flow of a hydraulic fluid from a hydraulic cylinder that drives a work implement, thereby suppressing vibration of the hydraulic cylinder when the rotation speed of wheels reaches a predetermined speed or higher. Furthermore, the controller disables the control of the vibration suppression function when the vehicle body is jacked up by the work implement, even when a vibration suppression instructing device has given an instruction for enabling the control of the vibration suppression function.

6 Claims, 7 Drawing Sheets

(52) U.S. Cl.
CPC ......... *E02F 9/2228* (2013.01); *F15B 2211/45* (2013.01); *F15B 2211/625* (2013.01); *F15B 2211/6313* (2013.01); *F15B 2211/6316* (2013.01); *F15B 2211/6355* (2013.01); *F15B 2211/6658* (2013.01); *F15B 2211/7053* (2013.01)

(58) Field of Classification Search
CPC ........ F15B 2211/625; F15B 2211/6313; F15B 2211/6316; F15B 2211/6355; F15B 2211/6658; F15B 2211/7053
See application file for complete search history.

(56) References Cited

U.S. PATENT DOCUMENTS

| | | | | |
|---|---|---|---|---|
| 7,610,136 | B2 * | 10/2009 | Okamura | E02F 9/2207 37/444 |
| 8,768,580 | B2 * | 7/2014 | Mizuochi | E02F 9/24 701/50 |
| 9,624,649 | B2 * | 4/2017 | Oota | E02F 9/24 |
| 11,332,911 | B2 * | 5/2022 | Takebayashi | E02F 9/2203 |
| 11,352,761 | B2 * | 6/2022 | Suzuki | E02F 9/2285 |
| 11,713,557 | B2 * | 8/2023 | Fukuda | E02F 9/2267 701/50 |
| 2010/0268410 | A1 | 10/2010 | Vigholm et al. | |
| 2013/0299266 | A1 * | 11/2013 | Ho | E02F 9/2217 180/271 |
| 2021/0123206 | A1 * | 4/2021 | Fukuda | E02F 9/2267 |
| 2025/0034834 | A1 * | 1/2025 | Young | E02F 9/2207 |

FOREIGN PATENT DOCUMENTS

| | | | |
|---|---|---|---|
| JP | 11-36375 | A | 2/1999 |
| JP | 2004-17849 | A | 1/2004 |
| JP | 2005-193890 | A | 7/2005 |
| JP | 2009-68164 | A | 4/2009 |
| WO | WO 2011/021970 | A1 | 2/2011 |

OTHER PUBLICATIONS

International Search Report (PCT/ISA/210) issued in PCT Application No. PCT/JP2023/005615 dated Apr. 11, 2023, with English translation (5 pages).
Japanese-language Written Opinion (PCT/ISA/237) issued in PCT Application No. PCT/JP2023/005615 dated Apr. 11, 2023, with English translation (7 pages).

* cited by examiner

WHEELED CONSTRUCTION MACHINE

TECHNICAL FIELD

The present invention relates to a wheeled construction machine, and more specifically relates to a wheeled construction machine having a vibration suppression function to suppress vibrations during traveling.

BACKGROUND ART

There have been known wheeled construction machines such as wheeled hydraulic excavators or wheel loaders that use accumulators to suppress vibrations during traveling (e.g. see Patent Document 1). In a traveling vibration controlling hydraulic circuit of a wheeled construction machine described in Patent Document 1, accumulators for vibration control are connected, via ON-OFF valves, to the bottom side of a hydraulic cylinder that drives a work implement including a boom, a bucket, and the like, and the head side of the hydraulic cylinder is connected to a fluid tank via another ON-OFF valve. When a selector switch is turned on by an operator and the vehicle speed becomes equal to or more than a predetermined speed during traveling, the ON-OFF valves are switched to the opened states, thereby causing communication between the accumulators and the bottom side of the hydraulic cylinder to be established, and communication between the head side of the hydraulic cylinder and the fluid tank to be established. Thus, the energy of the vertical vibrations of the work implement is absorbed and damped by the accumulators even if vertical vibrations of the wheeled construction machine are generated due to traveling. Accordingly, the vertical vibrations during traveling are suppressed.

PRIOR ART DOCUMENT

Patent Document

Patent Document 1: JP-H11-36375-A

SUMMARY OF THE INVENTION

Problem to be Solved by the Invention

Meanwhile, wheeled construction machines sometimes cause their wheels to rotate idly in a state where a jack-up action to lift their bodies by causing their work implements to touch grounds is being performed in order to remove mud or the like adhered to tires when moving from work sites toward public roads. However, in the technology described in Patent Document 1, when the selector switch for traveling vibration control has already been turned on at a start of movement from a work site (at a start of traveling), a function to control vibrations during traveling (traveling vibration control function) may be undesirably switched to the actuated state (the ON-OFF valves are switched to the opened states) if the rotation speed of idly rotating wheels reaches a predetermined speed or higher. In this case, the head side of the hydraulic cylinder communicates with the fluid tank, and thus the hydraulic fluid on the head side of the hydraulic cylinder escapes to the fluid tank undesirably, and the jacked-up state cannot be maintained in some cases. Because of this, in order to prevent the hydraulic fluid from flowing out of the head side of the hydraulic cylinder to the fluid tank during the jack-up action, it is necessary to switch off the selector switch for traveling vibration control before performing the jack-up action. In addition, when the wheeled construction machine starts traveling again after the end of the jack-up action and moves toward a public road, the traveling vibration control function cannot be activated if operation to switch on the selector switch is not performed again. In this manner, the operator needs to switch the selector switch for the traveling vibration control function on a case-by-case basis according to various situations.

The present invention has been made in order to solve the problems described above, and an object of the present invention is to provide a wheeled construction machine that can reduce the cumbersomeness of operation of a selector switch for a traveling-vibration suppression function.

Means for Solving the Problem

The present application includes a plurality of means for solving the problem described above, and an example thereof is a wheeled construction machine including: a travelable vehicle body equipped with a wheel; a work implement attached to the vehicle body; a controller that executes control of a vibration suppression function to control a flow of a hydraulic fluid from a hydraulic cylinder that drives the work implement, thereby suppressing vibration of the hydraulic cylinder when a rotation speed of the wheel reaches a predetermined speed or higher; and a vibration suppression instructing device that gives an instruction for enabling or disabling the control of the vibration suppression function by the controller. The controller is configured to disable the control of the vibration suppression function when the vehicle body is jacked up by the work implement, even when the vibration suppression instructing device has given an instruction for enabling the control of the vibration suppression function.

Advantages of the Invention

According to the present invention, even when the vibration suppression instructing device has given the instruction for enabling the control of the vibration suppression function, the control of the vibration suppression function is disabled in a state where the vehicle body is being jacked up by the work implement. Accordingly, it becomes unnecessary for an operator to perform operation for giving the instruction for disabling the control of the vibration suppression function to the vibration suppression instructing device. That is, the cumbersomeness of operation of the vibration suppression instructing device can be reduced.

Problems, configurations, and advantages other than those described above are made clear by the following explanation of embodiments.

MODES FOR CARRYING OUT THE INVENTION

Hereinbelow, wheeled construction machines according to embodiments of the present invention are explained using the figures. In this explanation, a wheeled hydraulic excavator is illustrated as the wheeled construction machine according to the embodiments of the present invention.

First Embodiment

Figure 1:
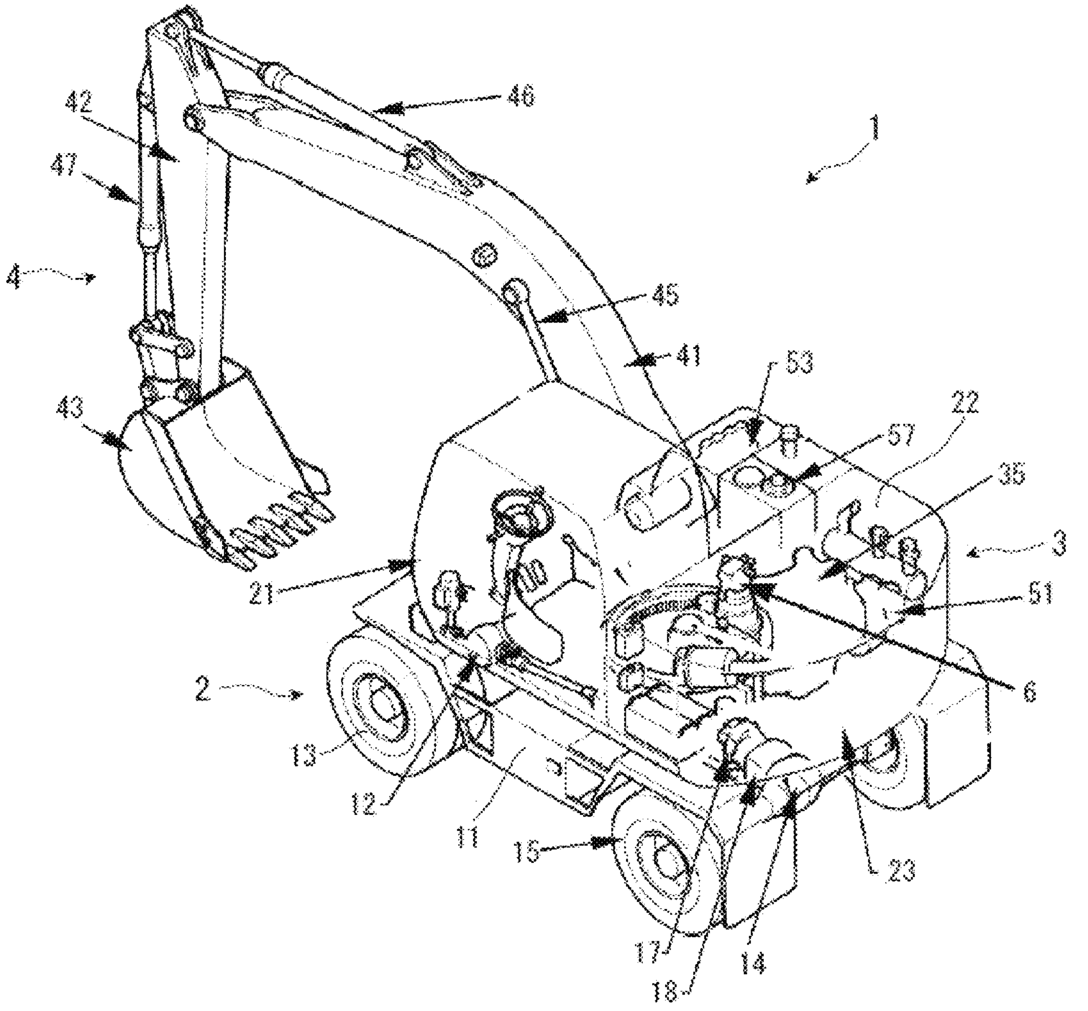
FIG. 1 is a perspective view depicting, in a partially see-through state, a wheeled hydraulic excavator as a wheeled construction machine according to a first embodiment of the present invention.
Figure 2:
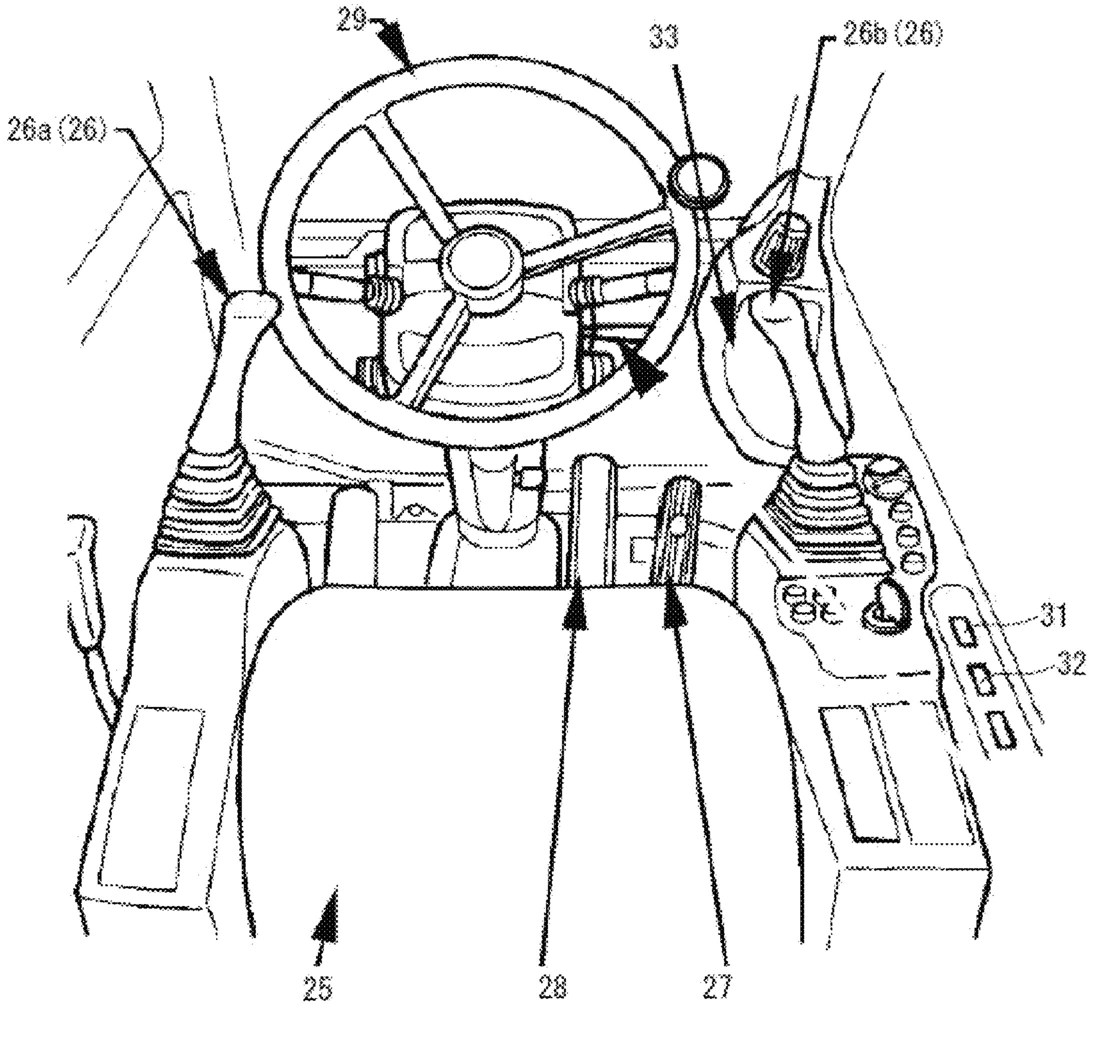
FIG. 2 is a figure depicting equipment in a cab of the wheeled construction machine according to the first embodiment depicted in FIG. 1.

First, the configuration of the wheeled hydraulic excavator as the wheeled construction machine according to the first embodiment of the present invention is explained using FIG. 1 and FIG. 2. FIG. 1 is a perspective view depicting the wheeled hydraulic excavator as the wheeled construction machine according to the first embodiment of the present invention in a partially see-through state. FIG. 2 is a figure depicting equipment in a cab of the wheeled construction machine according to the first embodiment depicted in FIG. 1.

In FIG. 1, a wheeled hydraulic excavator 1 (hereinafter, referred to as the hydraulic excavator 1) includes, as a vehicle body, a travelable wheeled travel body 2 and a swing body 3 mounted swingably on the travel body 2, and includes a front work implement 4 provided to the front of the swing body 3 such that the front work implement 4 can be driven in the up-down direction (can be raised and lowered). The hydraulic excavator 1 performs excavation work and the like using the front work implement 4 at a work site, and can move from the work site using the wheeled travel body 2, and travel on public roads. In addition, the hydraulic excavator 1 can have a configuration in which an earth removal blade 5 is attached to the rear end of the travel body 2 (see FIG. 7 mentioned later). The earth removal blade 5 is used for earth removal or leveling. The hydraulic excavator 1 can perform a jack-up action mentioned later using the front work implement 4 and the earth removal blade 5.

The travel body 2 includes: a frame 11 extending in the front-back direction; and left and right front wheels 13 (only the left wheel is depicted) as traveling wheels attached to the front side of the frame 11 via an axle 12 and left and right rear wheels 15 as traveling wheels attached to the rear side of the frame 11 via an axle 14. A travel hydraulic motor 17 and a transmission 18 are mounted on the frame 11.

The axle 12 and the axle 14 rotatably support the front wheels 13 and the rear wheels 15, respectively, and transmit rotational driving force of the travel hydraulic motor 17 to the front wheels 13 and the rear wheels 15, respectively. The axle 12 and the axle 14 each include a differential mechanism that distributes the rotational driving force to the left and right wheels. The axle 12 and the axle 14 are attached oscillatably to the frame 11. That is, the axle 12 and the axle 14 are configured to be capable of oscillating relative to the swing body 3 as a vehicle body. Note that the rotational driving force of the travel hydraulic motor 17 is transmitted to only either the front wheels 13 or the rear wheels 15, in another possible configuration. In addition, only either one of the axle 12 and the axle 14 is attached oscillatably relative to the frame 11, and the other one is fixed to the frame 11, in another possible configuration.

The swing body 3 is configured to be swing-driven by a swing hydraulic motor 6 relative to the frame 11 of the travel body 2. The swing body 3 includes: a cab 21 which an operator gets in; a machine room 22 that houses various types of devices; and a counter weight 23 for balancing the swing body 3 against the front work implement 4. As depicted in FIG. 2, an operator's seat 25 where an operator is seated, an operation device 26 that outputs operation instructions for the front work implement 4 and the like, an accelerator pedal 27, a brake pedal 28, and a steering 29 for operating traveling of the travel body 2, and the like are arranged in the cab 21. For example, the operation device 26 is an operation lever device for giving instructions for actions of the front work implement 4 in accordance with lever operation, and has a left operation lever **26*a* and a right operation lever 26*b*. Operation of each of a boom 41, an arm 42, and a bucket 43 mentioned later included in the front work implement 4 is assigned to the left operation lever 26*a* or the right operation lever 26*b*. The steering 29 is for steering the front wheels 13. A ride control switch 31 (hereinafter, referred to as the RC switch), an overload alert switch 32, and a monitor 33 (see FIG. 4 for all of them) that are mentioned later are arranged in the cab 21. For example, as depicted in FIG. 1, an engine 35 as the prime mover, a hydraulic pump 51, a control valve unit 53, a hydraulic working fluid tank 57, and the like are housed in the machine room 22**.

The front work implement 4 is an articulated work implement for performing excavation work or the like, and includes, for example, the boom 41, the arm 42, and the bucket 43 as an attachment. The boom 41 is pivotably coupled with the front of the swing body 3. The arm 42 is pivotably coupled with the front end of the boom 41. The bucket 43 is pivotably coupled with the front end of the arm 42. The boom 41, the arm 42, and the bucket 43 are driven by a boom cylinder 45, an arm cylinder 46, and a bucket cylinder 47 which are hydraulic actuators, respectively.

Figure 3:
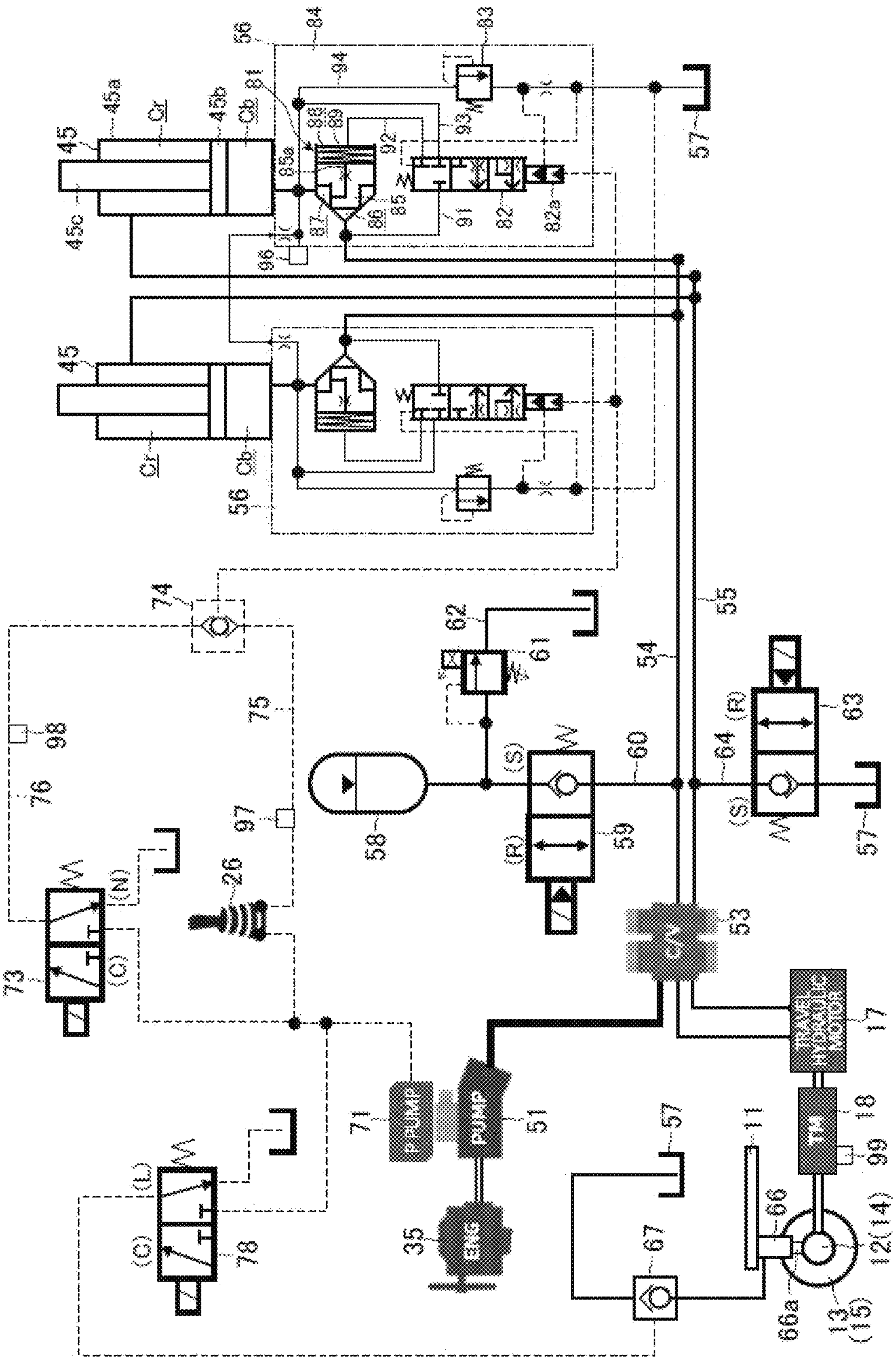
FIG. 3 is a circuit diagram depicting a schematic configuration of a hydraulic system and a block diagram depicting a schematic configuration of a travel system in the wheeled construction machine according to the first embodiment depicted in FIG. 1.

Next, the configurations of a hydraulic system and a travel system in the wheeled construction machine according to the first embodiment of the present invention are explained using FIG. 3. FIG. 3 is a circuit diagram depicting the schematic configuration of the hydraulic system of the wheeled construction machine according to the first embodiment depicted in FIG. 1, and a block diagram depicting the schematic configuration of the travel system of the wheeled construction machine.

In FIG. 3, the hydraulic system of the hydraulic excavator 1 includes: the hydraulic pump 51 that is driven by the engine 35 as the prime mover, and delivers a hydraulic fluid; a plurality of hydraulic actuators that are driven by the hydraulic fluid supplied from the hydraulic pump 51; and the control valve unit 53 that is a group of control valves that control the flow (direction and flow rate) of the hydraulic fluid supplied from the hydraulic pump 51 to each of the plurality of hydraulic actuators.

As the hydraulic actuators, FIG. 3 depicts only the travel hydraulic motor 17 that is driven at traveling and the boom cylinder 45 related to ride control. Hydraulic circuits of the other hydraulic actuators (the swing hydraulic motor 6, the arm cylinder 46, the bucket cylinder 47, etc.) are omitted.

The boom cylinder 45 has: a cylinder body 45*a*; a piston 45*b* slidably disposed in the cylinder body 45*a*; and a piston rod 45*c* extending from one side of the piston 45*b*. The inside of the cylinder body 45*a* is partitioned into a first fluid chamber Cb and a second fluid chamber Cr by the piston 45*b*. The first fluid chamber Cb is a fluid chamber to which the hydraulic fluid from the hydraulic pump 51 is supplied when the boom 41 (front work implement 4) is driven in the upward direction. On the other hand, the second fluid chamber Cr is a fluid chamber to which the hydraulic fluid from the hydraulic pump 51 is supplied when the boom 41 (front work implement 4) is driven in the downward direction. That is, when the hydraulic fluid is supplied to the first fluid chamber Cb, the boom cylinder 45 is extended to thereby drive the boom 41 in the upward direction. On the other hand, when the hydraulic fluid is supplied to the second fluid chamber Cr, the boom cylinder 45 is retracted to thereby drive the boom 41 in the downward direction. The weight of the boom 41 (front work implement 4) is applied to the first fluid chamber Cb. Hereinbelow, the first fluid chamber Cb and the second fluid chamber Cr are referred to as the bottom chamber and the rod chamber, respectively.

The control valve unit 53 is connected to the bottom chamber Cb side of the boom cylinder 45 via a first actuator line 54 and a hose rupture valve 56 (hereinafter, referred to as the HR valve), and is connected to the rod chamber Cr side of the boom cylinder 45 via a second actuator line 55. The first actuator line 54 is a hydraulic line that introduces the hydraulic fluid from the hydraulic pump 51 to the bottom chamber Cb of the boom cylinder 45 via the control valve unit 53. The second actuator line 55 is a hydraulic line that introduces the hydraulic fluid from the hydraulic pump 51 to the rod chamber Cr of the boom cylinder 45 via the control valve unit 53.

The HR valve 56 is installed between the bottom chamber Cb of the boom cylinder 45 and the first actuator line 54, and has a function to prevent the hydraulic fluid from flowing out of the bottom chamber Cb of the boom cylinder 45 to the first actuator line 54 when the first actuator line 54 is ruptured. Thereby, the boom 41 is prevented from falling when the first actuator line 54 is ruptured. The HR valve 56 has: a poppet valve 81 that prevents the hydraulic fluid from flowing out of the bottom chamber Cb of the boom cylinder 45 at the time when the first actuator line 54 is ruptured; a pilot valve 82 that drives the poppet valve 81; and a small relief valve 83 having an overload relief function. The poppet valve 81, the pilot valve 82, and the small relief valve 83 are built in a housing 84 of the HR valve 56.

The poppet valve 81 has a valve body 85 slidably disposed in the housing 84. The poppet valve 81 has: a line connection chamber 86 connected to the first actuator line 54; a cylinder connection chamber 87 connected to the bottom chamber Cb of the boom cylinder 45; and a back pressure chamber 88 provided on the opposite side of the line connection chamber 86 with the valve body 85 interposed therebetween. The valve body 85 is provided with a restrictor communication line 85*a* that establishes communication between the cylinder connection chamber 87 and the back pressure chamber 88. The poppet valve 81 is configured to switch communication between the line connection chamber 86 and the cylinder connection chamber 87 to the communication-established state or to the communication-interrupted state by the valve body 85 moving according to the balance between the acting force generated by the pressures of the line connection chamber 86 and the cylinder connection chamber 87, and the acting force generated by the pressure of the back pressure chamber 88 and the urging force of a spring 89.

The line connection chamber 86 and the back pressure chamber 88 of the poppet valve 81 are connected via a first connection line 91, the pilot valve 82, and a second connection line 92. The line connection chamber 86 and the cylinder connection chamber 87 of the poppet valve 81 are connected via the first connection line 91, the pilot valve 82, and a third connection line 93. The cylinder connection chamber 87 (the bottom chamber Cb of the boom cylinder 45) of the poppet valve 81 is connected, via a relief line 94, to the hydraulic working fluid tank 57 storing a hydraulic working fluid.

The pilot valve 82 has a pressure-receiving section 82*a* to which a cancellation pilot pressure mentioned later is introduced, and is configured to move in accordance with the cancellation pilot pressure introduced to the pressure-receiving section 82*a* to switch communication between the first connection line 91 and the second connection line 92 to the communication-established state or to the communication-interrupted state, and communication between the first connection line 91 and the third connection line 93 to the communication-established state or to the communication-interrupted state. Stated differently, the pilot valve 82 controls the poppet valve 81 to open and close by establishing or interrupting communication between the first connection line 91 and the second connection line 92, and controls the discharge of the hydraulic fluid from the bottom chamber Cb of the boom cylinder 45 to the control valve unit 53 bypassing the poppet valve 81, by establishing or interrupting communication between the first connection line 91 and the third connection line 93. The pilot valve 82 is configured to be at the closed position at normal time.

The small relief valve 83 is provided on the relief line 94, and is configured to open when the pressure of the relief line 94 (cylinder connection chamber 87) exceeds a set pressure. The HR valve 56 is configured such that, when the small relief valve 83 opens, the pilot valve 82 is driven and thus the poppet valve 81 opens.

Furthermore, the hydraulic system includes a configuration to realize the ride control to suppress vibrations at traveling of the hydraulic excavator 1 (at the time when the rotation speeds of the wheels 13 and 15 reach a predetermined speed or higher). Specifically, the hydraulic system includes an accumulator 58 for the ride control. The accumulator 58 absorbs pressure variation of the bottom chamber Cb of the boom cylinder 45, and, for example, is connected to the first actuator line 54 via a first ride control valve 59 (hereinafter, referred to as the first RC valve). That is, the accumulator 58 is connected to the bottom chamber Cb of the boom cylinder 45 via the first RC valve 59 and the HR valve 56. The accumulator 58 and the first actuator line 54 are connected to each other via a first connection line 60, and the first RC valve 59 is provided on the first connection line 60.

The first RC valve 59 is configured to switch, to the actuated state or to the stopped state, a vibration suppression function to control the flow of the hydraulic fluid between the accumulator 58 and the bottom chamber Cb of the boom cylinder 45 (the flow of the hydraulic fluid through the first connection line 60), thereby absorbing pressure variation of the bottom chamber Cb of the boom cylinder 45 using the accumulator 58 (i.e. the ride control to suppress vibration during traveling). For example, the first RC valve 59 is configured to be capable of switching to: a first position S at which the flow of the hydraulic fluid from the accumulator 58 to the bottom chamber Cb of the boom cylinder 45 is permitted, and, on the other hand, the flow of the hydraulic fluid from the bottom chamber Cb of the boom cylinder 45 to the accumulator 58 is inhibited; and a second position R at which the bidirectional flow of the hydraulic fluid between the accumulator 58 and the bottom chamber Cb of the boom cylinder 45 is permitted. The first position S is a position for stopping the ride control by disabling the movement of the hydraulic fluid between the accumulator 58 and the bottom chamber Cb of the boom cylinder 45. On the other hand, the second position R is a position for actuating the ride control by establishing communication between the accumulator 58 and the bottom chamber Cb of the boom cylinder 45, and enabling the movement of the hydraulic fluid therebetween. For example, the first RC valve 59 is a solenoid valve configured to switch to the first position S (ride-control stopped position) at normal time. The first RC valve 59 is configured to be switched in response to a command from a controller 100 mentioned later.

In addition, the accumulator 58 is connected to the hydraulic working fluid tank 57 via a ride control relief valve 61. A relief line 62 is connected to a portion between the accumulator 58 and the first RC valve 59 on the first connection line 60, and the ride control relief valve 61 is provided on the relief line 62. The ride control relief valve 61 is for specifying the upper limit value of the accumulated pressure of the accumulator 58, and is configured to open when the pressure of the relief line 62 (accumulator 58) exceeds the set pressure.

In the hydraulic system, as a configuration to realize the ride control, the rod chamber Cr of the boom cylinder 45 is connected to the hydraulic working fluid tank 57 via a second ride control valve 63 (hereinafter, referred to as the second RC valve). Specifically, the hydraulic working fluid tank 57 is connected to the second actuator line 55 via a second connection line 64, and the second RC valve 63 is provided on the second connection line 64.

The second RC valve 63 is configured to switch the vibration suppression function of the accumulator 58 (ride control) to the actuated state or to the stopped state by controlling the flow of the hydraulic working fluid between the rod chamber Cr of the boom cylinder 45 and the hydraulic working fluid tank 57 (the flow of the hydraulic fluid in the second connection line 64). For example, the second RC valve 63 is configured to be capable of switching to: a first position S at which the flow of the hydraulic working fluid from the hydraulic working fluid tank 57 to the rod chamber Cr of the boom cylinder 45 is permitted, and, on the other hand, the flow of the hydraulic working fluid from the rod chamber Cr of the boom cylinder 45 to the hydraulic working fluid tank 57 is inhibited; and a second position R at which the bidirectional flow of the hydraulic fluid between the rod chamber Cr of the boom cylinder 45 and the hydraulic working fluid tank 57 is permitted. That is, the first position S is a position for stopping the ride control by inhibiting the hydraulic working fluid from flowing out of the rod chamber Cr of the boom cylinder 45. On the other hand, the second position R is a position for actuating the ride control by establishing communication between the rod chamber Cr of the boom cylinder 45 and the hydraulic working fluid tank 57, and enabling the movement of the hydraulic working fluid therebetween. For example, the second RC valve 63 is a solenoid valve configured to switch to the first position S (ride-control stopped position) at normal time. The second RC valve 63 is configured to be switched in response to a command from a controller 100 mentioned later.

The first RC valve 59 and the second RC valve 63 of the present embodiment are configured as a selector valve device that switch, to the actuated state or to the stopped state, the vibration suppression function to control the flow of the hydraulic fluid between the bottom chamber Cb of the boom cylinder 45 and the accumulator 58 and control the flow of the hydraulic fluid between the rod chamber Cr of the boom cylinder 45 and the hydraulic working fluid tank 57, thereby absorbing pressure variation of the bottom chamber Cb of the boom cylinder 45 using the accumulator 58.

Stated differently, the hydraulic excavator 1 includes: the travelable vehicle body (the travel body 2 and the swing body 3) equipped with the wheels (the front wheels 13 and the rear wheels 15); the work implement (e.g. the boom 41, the arm 42, and the bucket 43) attached to the vehicle body; and the vibration suppression function to suppress the vibration of the hydraulic cylinder (e.g. the boom cylinder 45), which drives the work implement, at the time when the rotation speed of the wheels (the front wheels 13 and the rear wheels 15) reaches a predetermined speed or higher.

In addition, the hydraulic excavator 1 has: the hydraulic pump (hydraulic pump 51) that supplies the hydraulic fluid to the hydraulic cylinders (e.g. the boom cylinder 45, the arm cylinder 46, and the bucket cylinder 47) that drive the work implement; the accumulator (accumulator 58) that is provided on the hydraulic line (first actuator line 54) between the hydraulic pump (hydraulic pump 51) and the hydraulic cylinder (e.g. the boom cylinder 45), and absorbs pressure variation of the hydraulic cylinder (e.g. the boom cylinder 45); and the selector valve device (e.g. the first RC valve 59 and the second RC valve 63). The selector valve device is switched to: the first state where the selector valve device permits the flow of the hydraulic fluid from the hydraulic cylinder (e.g. the boom cylinder 45) to the accumulator (accumulator 58) and permits the flow of the hydraulic fluid from the hydraulic cylinder (e.g. the boom cylinder 45) to the tank (tank 57) to actuate the vibration suppression function; and the second state where the selector valve device interrupts the flow of the hydraulic fluid from the hydraulic cylinder (e.g. the boom cylinder 45) to the accumulator (accumulator 58) and interrupts the flow of the hydraulic fluid from the hydraulic cylinder (e.g. the boom cylinder 45) to the tank (tank 57) to stop the vibration suppression function.

Furthermore, the hydraulic system includes a pilot hydraulic circuit that drives each control valve of the control valve unit 53, and cancels the function of the HR valve 56. The pilot hydraulic circuit includes: a pilot pump 71 driven by the engine 35 as the prime mover; the operation device 26 (also see FIG. 2) that generates an operation pilot pressure to drive the control valves of the control valve unit 53, and generates a cancellation pilot pressure used for canceling the function of the HR valve 56, using the delivery pressure of the pilot pump 71 as the source pressure; an HRV cancellation valve 73 that outputs the delivery pressure of the pilot pump 71 as a cancellation pilot pressure used for canceling the function of the HR valve 56, bypassing the operation device 26; and a shuttle valve 74 that selects the higher cancellation pilot pressure from either one of the cancellation pilot pressure output from the operation device 26 and the cancellation pilot pressure output from the HRV cancellation valve 73, and outputs the higher cancellation pilot pressure to the HR valve 56.

The operation device 26 is connected to one input port of the shuttle valve 74 via a first pilot line 75. It should be noted that the first pilot line 75 is used only for boom lowering operation. The HRV cancellation valve 73 is connected to the pilot pump 71 and the other input port of the shuttle valve 74 via a second pilot line 76. The output port of the shuttle valve 74 is connected to the pressure-receiving section 82*a* of the pilot valve 82 of the HR valve 56. Note that, in FIG. 3, a hydraulic circuit representing an input of the operation pilot pressure from the operation device 26 to the control valve unit 53 is omitted.

The HRV cancellation valve 73 is configured to be selectively switched between: a first position N at which connection between the pilot pump 71 and the shuttle valve 74 is interrupted; and a second position C at which connection between the pilot pump 71 and the shuttle valve 74 is established, and can switch between maintaining or canceling the function of the HR valve 56. The first position N is a position for maintaining the function of the HR valve 56 (a position for not performing forced cancellation of the function) without causing the cancellation pilot pressure to be output to the pilot valve 82 of the HR valve 56 (shuttle valve 74). The second position C is a position for performing forced cancellation of the function of the HR valve 56 by causing the cancellation pilot pressure to be output to the pilot valve 82 of the HR valve 56 (shuttle valve 74). For example, the HRV cancellation valve 73 is a solenoid valve configured to be positioned at the first position N at normal time. The HRV cancellation valve 73 is configured to be switched in response to a command from the controller 100 mentioned later.

The HR valve 56 is provided with a first pressure sensor 96 that senses the pressure of the cylinder connection chamber 87. That is, the first pressure sensor 96 is configured to sense the pressure of the bottom chamber Cb of the boom cylinder 45 (hereinafter, referred to as the bottom pressure in some cases). The first pressure sensor 96 outputs a sensing signal according to a sensing value to the controller 100 mentioned later.

The first pilot line 75 is provided with a second pressure sensor 97. The second pressure sensor 97 is configured to sense the operation pilot pressure for the control valve unit 53 generated by the operation device 26, and functions as an operation sensor that senses an operation instruction from the operation device 26. The second pressure sensor 97 outputs a sensing signal according to a sensing value to the controller 100 mentioned later.

The second pilot line 76 is provided with a third pressure sensor 98. The third pressure sensor 98 is configured to sense the cancellation pilot pressure output by the HRV cancellation valve 73, and the sensed cancellation pilot pressure is used as information for determining whether the HRV cancellation valve 73 is malfunctioning or not. The third pressure sensor 98 outputs a sensing signal according to the sensing value to the controller 100 mentioned later.

In the travel system of the hydraulic excavator 1, the travel hydraulic motor 17 is driven by the hydraulic fluid from the hydraulic pump 51 being supplied via the control valve unit 53. The rotational power of the travel hydraulic motor 17 is transmitted to the front wheels 13 and the rear wheels 15 (wheels) via a motive power transmission mechanism such as the transmission 18 and the axles 12 and 14. The transmission 18 is configured to transmit the rotational power of the travel hydraulic motor 17 to the front wheels 13 and the rear wheels 15 with speed adjustments. A speed sensor 99 that senses the rotation speed (number of revolutions) of the wheels 13 and 15 is attached to the transmission 18. The traveling speed of the hydraulic excavator 1 (vehicle body 2, 3) is calculated on the basis of the rotation speed (number of revolutions) of the wheels 13 and 15, which is a sensing value by the speed sensor 99. The speed sensor 99 outputs a sensing signal according to the sensed rotation speed (number of revolutions) to the controller 100 mentioned later.

In the hydraulic excavator 1, the axles 12 and 14 are oscillatably attached to the frame 11, and a pair of left and right ram cylinders 66 (only one of them is depicted) are interposed between each of the axles 12 and 14 and the frame 11. Each ram cylinder 66 has a rod 66*a*, and functions as a buffer that absorbs vibrations on the side of the frame 11 by extension and retraction of the rod 66*a* according to oscillations of the axle 12 or 14. The hydraulic excavator 1 includes a locking mechanism to lock extension and retraction of the rods 66*a* of the ram cylinders 66, thereby disabling oscillations of the axles 12 and 14 relative to the frame 11.

Specifically, as the locking mechanism, each ram cylinder 66 is connected to the hydraulic working fluid tank 57 via a pilot check valve 67. The pilot check valve 67 is configured to permit the flow of the hydraulic working fluid from the hydraulic working fluid tank 57 to the ram cylinders 66, and, on the other hand, inhibit the flow of the hydraulic working fluid from the ram cylinders 66 to the hydraulic working fluid tank 57. The pilot port of the pilot check valve 67 is configured to be selectively connected to either one of the pilot pump 71 and the hydraulic working fluid tank 57 via an axle lock valve 78.

The axle lock valve 78 is configured to be selectively switched between: a first position L at which the axle lock valve 78 connects the pilot port of the pilot check valve 67 to the hydraulic working fluid tank 57; and a second position C at which the axle lock valve 78 connects the pilot port of the pilot check valve 67 to the pilot pump 71. The first position L is a lock position for actuating the axle lock to disable oscillations of the axles 12 and 14 relative to the frame 11. The second position C is a cancellation position for canceling the axle lock.

When the axle lock valve 78 is at the first position L, the pilot check valve 67 functions as a check valve and thus inhibits the hydraulic working fluid from flowing out of the ram cylinders 66. This disables extension and retraction of the ram cylinders 66, and results in the axle-lock, which is to disable oscillations of the axles 12 and 14, being in actuated state (locked state). When the axle lock valve 78 is at the second position C, the pilot check valve 67 functions as an open valve and thus communication between the ram cylinders 66 and the hydraulic working fluid tank 57 is established, thereby permitting the bidirectional flow of the hydraulic working fluid. This enables extension and retraction of the ram cylinders 66, and the ram cylinders 66 extend and retract following oscillations of the axles 12 and 14 to absorb vibrations on the side of the frame 11. That is, the axle lock is canceled (in a canceled state). For example, the axle lock valve 78 is a solenoid valve configured to be positioned at the first position L at normal time. The axle lock valve 78 is configured to be switched in response to a command from the controller 100 mentioned later.

Figure 4:
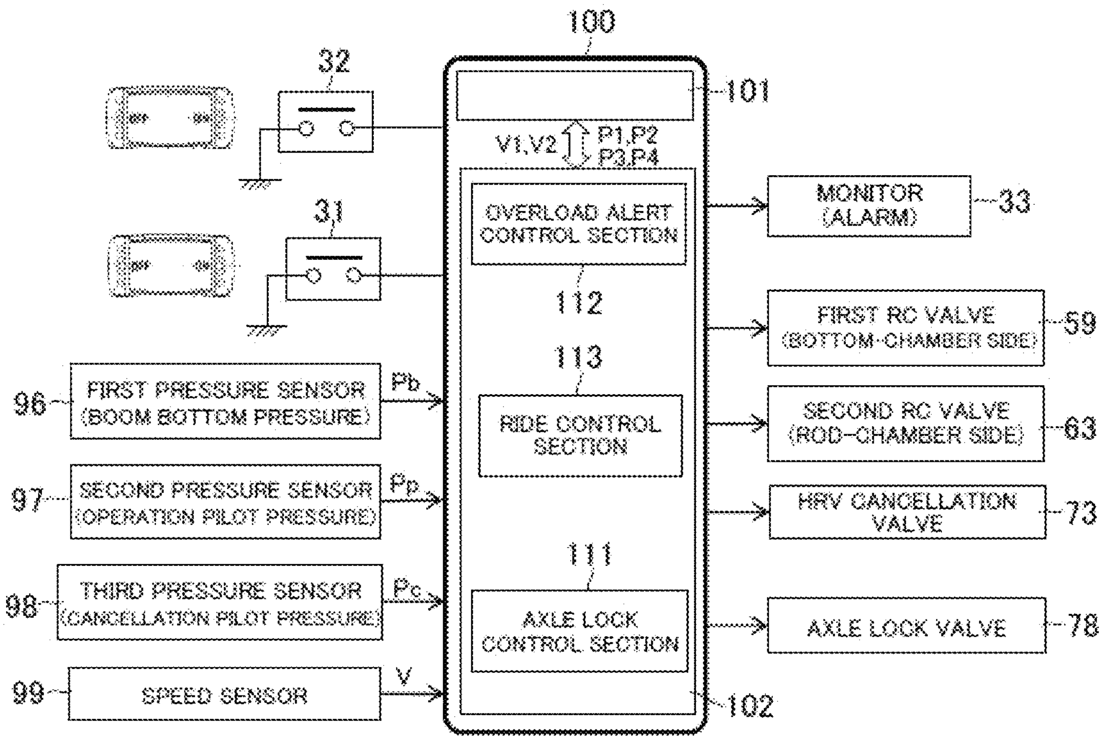
FIG. 4 is a block diagram depicting functions of a controller in the wheeled construction machine according to the first embodiment depicted in FIG. 1.
Figure 5:
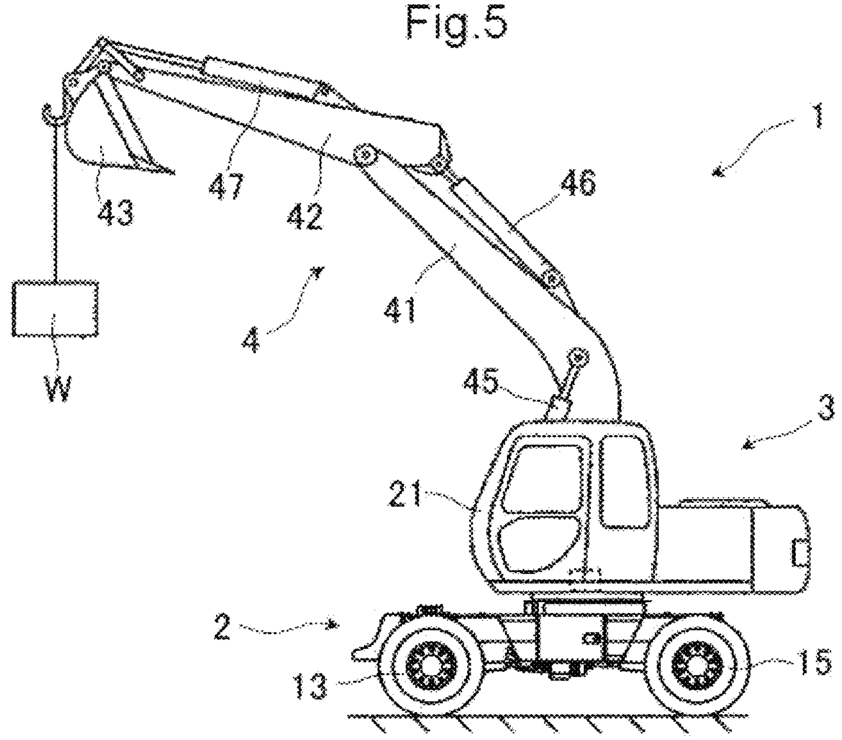
FIG. 5 is an explanatory diagram depicting load hanging work to be performed when the controller of the wheeled construction machine according to the first embodiment depicted in FIG. 4 performs overload alert control.

Next, the hardware configuration and functional configuration of the controller in the wheeled construction machine according to the first embodiment of the present invention are explained using FIG. 4 and FIG. 5. FIG. 4 is a block diagram depicting functions of the controller of the wheeled construction machine according to the first embodiment depicted in FIG. 1. FIG. 5 is an explanatory diagram depicting load hanging work to be performed when the controller of the wheeled construction machine according to the first embodiment depicted in FIG. 4 performs overload alert control.

In summary, the controller 100 of the present embodiment is configured to perform a switching control of the axle lock to disable oscillations of the axles 12 and 14 relative to the frame 11, and perform the overload alert control to generate an alert when the load of load hanging work performed by the front work implement 4 is excessively large. Moreover, the controller 100 is configured to execute the ride control (vibration suppression function) to control the flow of the hydraulic fluid from the boom cylinder 45, thereby suppressing vibrations of the boom cylinder 45 during traveling of the vehicle body 2, 3 (at the time when the rotation speeds of the wheels 13 and 15 reach a predetermined speed).

Specifically, the controller 100 is electrically connected with the overload alert switch 32 and the RC switch 31. The overload alert switch 32 is an instructing device for giving an instruction for the overload alert control mentioned above by operation by an operator, and outputs, to the controller 100, an ON signal representing an instruction for enabling the overload alert control or an OFF signal representing an instruction for disabling the overload alert control. The RC switch 31 is a vibration suppression instructing device for giving instructions for enabling and disabling control of the ride control (vibration suppression function) by the controller 100 in accordance with operation by the operator, and outputs, to the controller 100, an ON signal representing an instruction for enabling the control of the ride control (vibration suppression function) by the controller 100 or an OFF signal representing an instruction for disabling the control of the ride control (vibration suppression function) by the controller 100.

The controller 100 is also electrically connected with the first pressure sensor 96, the second pressure sensor 97, and the third pressure sensor 98, and receives, as sensing signals, inputs of a sensing value Pb from the first pressure sensor 96 (boom bottom pressure), a sensing value Pp from the second pressure sensor 97 (the operation pilot pressure of the operation device 26), and a sensing value Pc from the third pressure sensor 98 (the cancellation pilot pressure of the HRV cancellation valve 73). In addition, the controller 100 is electrically connected with the speed sensor 99, and receives an input of sensing value V from the speed sensor 99 (the rotation speed of the wheels 13 and 15) as a sensing signal. The controller 100 converts the sensing value V received from the speed sensor 99 into a traveling speed Vt of the hydraulic excavator 1 (vehicle body 2, 3).

For example, the controller 100 includes a storage device 101 including a RAM, a ROM, or the like, and a processor 102 such as a CPU or an MPU. The storage device 101 has stored thereon in advance programs and information necessary for various types of control such as the switching control of the axle lock, the overload alert control, or the ride control mentioned above. As the storage device 101, instead of or in addition to a semiconductor memory such as a ROM or RAM, a magnetic storage device such as a hard disk drive is included, in another possible configuration. The processor 102 reads various types of program and information from the storage device 101 as appropriate, and executes processes according to the programs to thereby realize various types of function including the following functional sections.

The controller 100 has an axle lock control section 111, an overload alert control section 112, and a ride control section 113.

The axle lock control section 111 is configured to perform the switching control of the axle lock to switch the locking mechanism that disables oscillations of the axles 12 and 14 to the locked state or to the canceled state by switching the axle lock valve 78 depicted in FIG. 3 to permit or inhibit extension and retraction of the ram cylinders 66. Where the axle lock is to be the locked state, a command for switching the axle lock valve 78 to the first position L (lock position) is output to the axle lock valve 78. In contrast, where the axle lock is to be the canceled state, a command for switching the axle lock valve 78 to the second position C (cancellation position) is output to the axle lock valve 78. The axle lock control section 111 retains information on the switch position of the axle lock valve 78 (i.e. information on whether the locking mechanism is in the locked state or the canceled state). For example, the axle lock control section 111 can acquire a signal from the axle lock valve 78.

The overload alert control section 112 is configured to perform the overload alert control to generate an alert when the weight of a hung load W is excessively large during execution of load hanging work (crane work) by the front work implement 4 like the one depicted in FIG. 5. Specifically, when an ON signal for the overload alert switch 32 is input, the actual weight of the hung load W is computed and it is determined whether the actual weight as a computation result thereof exceeds a rated weight or not. When a result of the determination is that the weight exceeds the rated weight, a command for an alert is output to the monitor 33 as an alarm, for example.

The ride control section 113 is configured to control the first RC valve 59 and the second RC valve 63 as the selector valve device and control the HRV cancellation valve 73, thereby switching the ride control to the actuated state or to the stopped state.

When an OFF signal (an instruction for disabling the control of the ride control by the controller 100) is input from the RC switch 31, the ride control section 113 controls the first RC valve 59 and the second RC valve 63 as the selector valve device such that the ride control is in the stopped state and controls the HRV cancellation valve 73 such that the function of the HR valve 56 is maintained. Specifically, commands (e.g. OFF signals) for switching the first RC valve 59 and the second RC valve 63 to the first positions S (the positions at which the first RC valve 59 and the second RC valve 63 inhibit the flow from the boom cylinder 45 to the accumulator 58 and the hydraulic working fluid tank 57) are output to the first RC valve 59 and the second RC valve 63. Moreover, a command (e.g. an OFF signal) for switching the HRV cancellation valve 73 to the first position N (the position at which the HRV cancellation valve 73 inhibits an output of the cancellation pilot pressure to the HR valve 56) is output to the HRV cancellation valve 73.

When an ON signal (an instruction for enabling the control of the ride control by the controller 100) is input from the RC switch 31, the ride control section 113 determines whether the ride control is to be the actuated state or not based on a presence or absence of the instruction for the overload alert control from the overload alert switch 32 (ON signal or OFF signal) and the state of the locking mechanism (the locked state or canceled state of the axle lock). In addition, the ride control section 113 determines whether the ride control is to be the actuated state or not based on three execution conditions regarding a sensing value by the first pressure sensor 96 (boom bottom pressure Pb), a sensing value by the second pressure sensor 97 (an operation pilot pressure Pp of the control valve unit 53), and a sensing value by the speed sensor 99 (a rotation speed V of the wheels 13 and 15). According to results of the determinations, the first RC valve 59, the second RC valve 63, and the HRV cancellation valve 73 are controlled. Where the ride control is to be switched to the actuated state, commands (e.g. excitation currents) for switching the first RC valve 59 and the second RC valve 63 to the second positions R (the positions at which the bidirectional flow between the bottom chamber Cb of the boom cylinder 45 and the accumulator 58 is permitted) are output to the first RC valve 59 and the second RC valve 63. Moreover, a command (e.g. an excitation current) for switching the HRV cancellation valve 73 to the second position C (the position at which the cancellation pilot pressure is output to the HR valve 56) is output to the HRV cancellation valve 73.

Note that, where the HRV cancellation valve 73 is malfunctioning, the ride control is to be the stopped state. Whether the HRV cancellation valve 73 is malfunctioning or not is determined on the basis of a sensing value by the third pressure sensor 98 (the cancellation pilot pressure output by the HRV cancellation valve 73).

Figure 6:
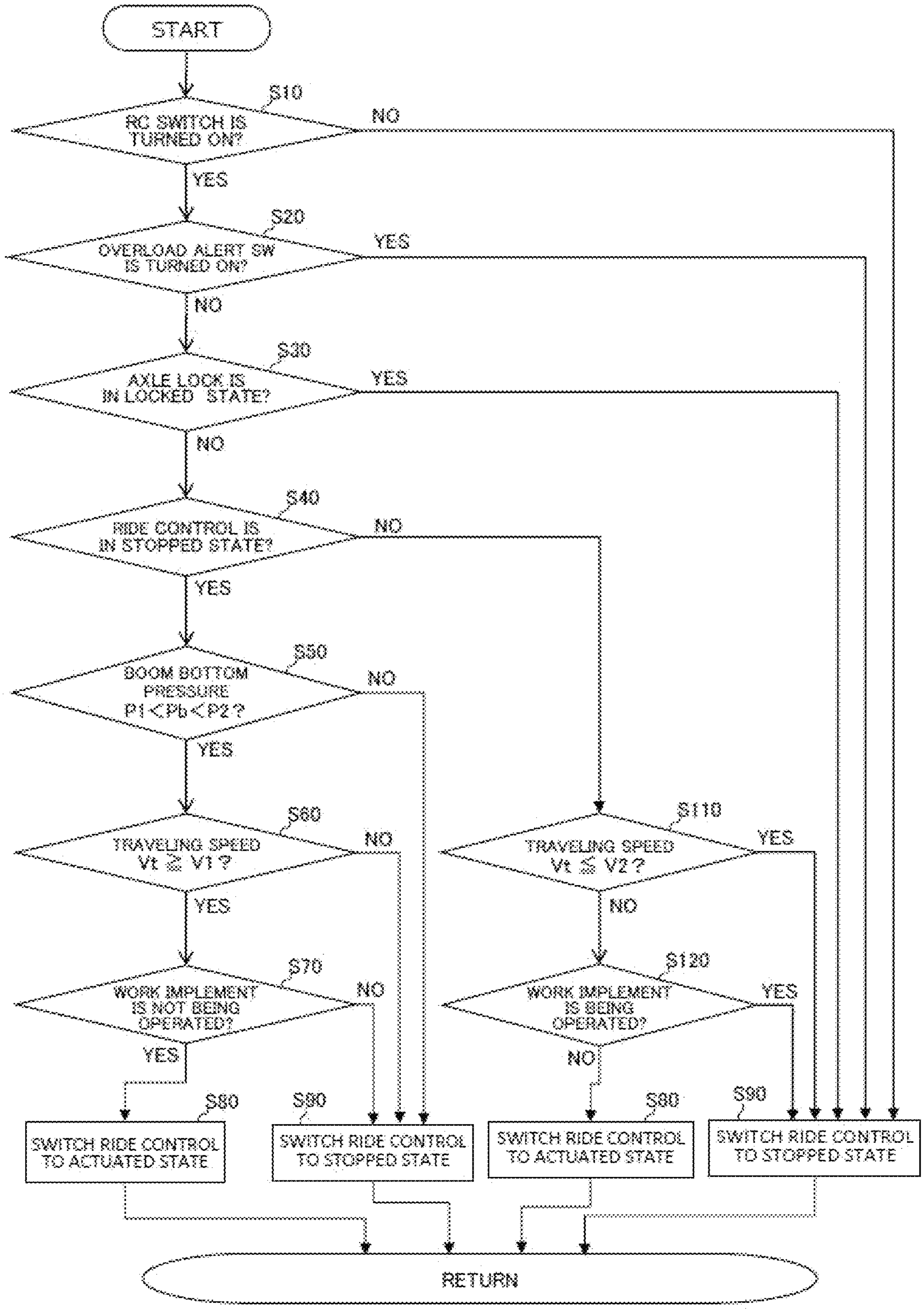
FIG. 6 is a flowchart depicting an example of a procedure of ride control performed by the controller of the wheeled construction machine according to the first embodiment depicted in FIG. 4.
Figure 7:
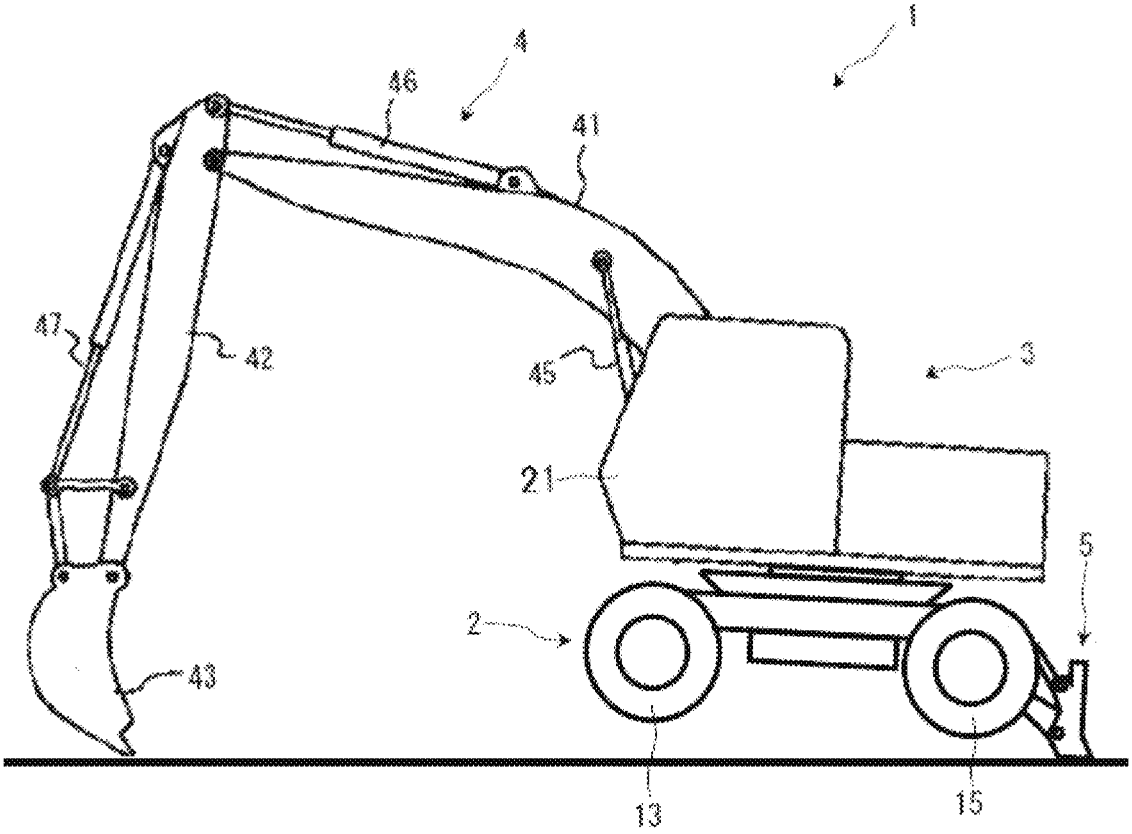
FIG. 7 is a figure for explaining a jack-up action of the wheeled construction machine according to the first embodiment depicted in FIG. 1.

Next, a processing procedure performed by the ride control section of the controller in the wheeled construction machine according to the first embodiment of the present invention is explained using FIG. 6 and FIG. 7. FIG. 6 is a flowchart depicting an example of the processing procedure of the ride control performed by the controller of the wheeled construction machine according to the first embodiment depicted in FIG. 4. FIG. 7 is a figure for explaining the jack-up action performed by the wheeled construction machine according to the first embodiment depicted in FIG. 1.

In FIG. 6, the ride control section 113 (see FIG. 4) of the controller 100 determines whether an instruction signal from the RC switch 31 is an ON signal (an instruction for enabling the control of the ride control by the controller 100) or not (Step S10). Where the instruction signal of the RC switch 31 is an ON signal (when a result of the determination is YES), the procedure proceeds to Step S20; in contrast, where the instruction signal of the RC switch 31 is an OFF signal (an instruction for disabling the control of the ride control by the controller 100) (when the result of the determination is NO), the procedure proceeds to Step S90.

Where the result of the determination at Step S10 is NO, the ride control section 113 switches the ride control to the stopped state (Step S90). Specifically, commands for switching the first RC valve 59 and the second RC valve 63 (selector valve device) to the first positions N (second state) are output to the first RC valve 59 and the second RC valve 63. Thereby, the flow from the bottom chamber Cb of the boom cylinder 45 to the accumulator 58 is inhibited, and the flow from the rod chamber Cr of the boom cylinder 45 to the hydraulic working fluid tank 57 is inhibited. Moreover, the HRV cancellation valve 73 is controlled such that the function of the HR valve 56 is maintained. Specifically, a command for switching the HRV cancellation valve 73 depicted in FIG. 3 to the first position N is output to the HRV cancellation valve 73.

In contrast, where the result of the determination at Step S10 is YES, it is determined whether an instruction signal from the overload alert switch 32 is an ON signal (whether an instruction for the overload alert control is being given) or not (Step S20). Where the instruction signal of the overload alert switch 32 is an OFF signal (when a result of the determination is NO, which means that an instruction for the overload alert control is not being given), the procedure proceeds to Step S30; in contrast, where the instruction signal of the overload alert switch 32 is an ON signal (when the result of the determination is YES), the procedure proceeds to Step S90, at which the ride control is switched to the stopped state.

Where the result of the determination at Step S20 is NO, the ride control section 113 determines whether the axle lock (locking mechanism) is in the locked state or not (Step S30). Where the axle lock is in the locked state (when a result of the determination of YES), the procedure proceeds to Step S90, at which the ride control is switched to the stopped state; in contrast, where the axle lock is in the canceled state (when the result of the determination is NO), the procedure proceeds to Step S40. For example, the state (the locked state or the canceled state) of the axle lock (locking mechanism) is determined on the basis of information about the switch position of the axle lock valve 78 of the axle lock control section 111. That is, where the information about the switch position of the axle lock valve 78 represents that the axle lock valve 78 is at the first position L, it is determined that the axle lock is in the locked state. On the other hand, where the information about the switch position represents that the axle lock valve 78 is at the second position C, it is determined that the axle lock is at the canceled state.

Where the result of the determination at Step S30 is NO, the ride control section 113 determines whether the ride control is in the stopped state or not (Step S40). Where the ride control is in the stopped state (when a result of the determination is YES), the procedure proceeds to Step S50; in contrast, where the ride control is actuated (when the result of the determination is NO), the procedure proceeds to Step S110. For example, the state (the stopped state or the actuated state) of the ride control is determined on the basis of information about the switch positions of the first RC valve 59 and the second RC valve 63. That is, where the information about the switch positions of the first RC valve 59 and the second RC valve 63 represents that the first RC valve 59 and the second RC valve 63 are at the first positions S, it is determined that the ride control is in the stopped state. On the other hand, where the information about the switch positions represents that the first RC valve 59 and the second RC valve 63 are at the second positions R, it is determined that the ride control is in the actuated state.

Where the result of the determination at Step S40 is YES, the ride control section 113 determines whether the pressure of the bottom chamber Cb of the boom cylinder 45 (boom bottom pressure Pb), which is a sensing value by the first pressure sensor 96, satisfies a ride control execution condition or not (Step S50). Where the boom bottom pressure Pb satisfies the condition (when a result of the determination is YES), the procedure proceeds to Step S60; in contrast, where the execution condition is not satisfied (when the result of the determination is NO), the procedure proceeds to Step S90, at which the ride control is switched to the stopped state.

Specifically, where the boom bottom pressure Pb, which is a sensing value by the first pressure sensor 96, is higher than a first threshold P1 and lower than a second threshold P2 (when $P1<Pb<P2$), it is determined that the result of the determination is that a ride control first execution condition is satisfied (YES). Otherwise, it is determined that the result of the determination is that the ride control first execution condition is not satisfied (NO). For example, the first threshold P1 is a lower limit value of the boom bottom pressure necessary for keeping the front work implement 4 in the air. For example, the second threshold P2 is set to equal to or lower than the set pressure of the ride control relief valve 61.

The condition, Pb>P1, is a condition for determining whether the hydraulic excavator 1 is performing the jack-up action or not. For example, as depicted in FIG. 7, the jack-up action is an action for causing the bucket 43 (attachment) of the front work implement 4 and the earth removal blade 5 to touch a ground, and lifting the travel body 2 and the swing body 3. During the jack-up action, the pressure of the rod chamber Cr of the boom cylinder 45 gets high; in contrast, the pressure of the bottom chamber Cb (boom bottom pressure Pb) gets low. On the basis of this, where the boom bottom pressure Pb is equal to or lower than the first threshold P1, it is determined that there is a possibility that the jack-up action is being performed, and the ride control first execution condition is not satisfied.

The condition, Pb<P2, is a determination condition for preventing the boom 41 from sagging when the ride control is executed. Where the hydraulic fluid having flowed from the bottom chamber Cb of the boom cylinder 45 into the accumulator 58 is at a high pressure, a ride control relief 62 opens in some cases. In this case, since the bottom chamber Cb of the boom cylinder 45 communicates with the hydraulic working fluid tank 57, the piston rod 45*c* of the boom cylinder 45 is retracted, and the boom 41 sags undesirably. Accordingly, where the boom bottom pressure Pb exceeds the second threshold P2, there is a possibility that the boom 41 sags due to opening of the ride control relief 62, and it is determined that the ride control first execution condition is not satisfied.

Where a result of the determination at Step S50 is YES, the ride control section 113 determines whether the traveling speed Vt of the hydraulic excavator 1 satisfies a ride control second execution condition or not (Step S60). The second execution condition is a determination condition regarding the necessity for suppression of vibrations generated by traveling of the hydraulic excavator 1. Where the traveling speed Vt satisfies the second execution condition (when a result of the determination is YES), the procedure proceeds to Step S70; in contrast, where the traveling speed Vt does not satisfy the second execution condition (when the result of the determination is NO), the procedure proceeds to Step S90, at which the ride control is switched to the stopped state.

Specifically, where the traveling speed Vt of the hydraulic excavator 1 obtained by converting the sensing value received from the speed sensor 99 (the rotation speed V of the wheels 13 and 15) is equal to or more than a first threshold V1 (in a case where Vt≥V1), it is determined that the result of the determination is that the ride control second execution condition is satisfied (YES). Otherwise, it is determined that the result of the determination is that the second execution condition is not satisfied (NO). For example, the first threshold V1 is a setting value that an operator can input on an input device (e.g. the monitor 33 having a touch panel, etc.). For example, as the first threshold V1, the setting value of 4 to 10 km/h is assumed.

Where the result of the determination at Step S60 is YES, the ride control section 113 determines whether a ride control third execution condition is satisfied or not on the basis of whether the front work implement 4 is being operated or not by the operation device 26 (Step S70). The third execution condition is a determination condition for preventing the hydraulic fluid from the hydraulic pump 51 flowing into a ride control hydraulic circuit at the time of actuation of the ride control due to operation of the front work implement 4. Where the front work implement 4 is not being operated using the operation device 26 (when a result of the determination is YES), the procedure proceeds to Step S80, at which the ride control is switched to the actuated state; in contrast, where the front work implement 4 is being operated using the operation device 26 (when the result of the determination is NO), the procedure proceeds to Step S90, at which the ride control is to be the stopped state.

Specifically, where the operation pilot pressure Pp output by the operation device 26, which is a sensing value by the second pressure sensor 97, is equal to or lower than a third threshold P3 (when Pp≤P3), it is determined that the front work implement 4 is not being operated, and the ride control third execution condition is satisfied (YES). Otherwise, it is determined that the work implement 4 is being operated, and the third execution condition is not satisfied (NO). For example, the third threshold P3 is an operation pilot pressure at which each control valve of the control valve unit 53 is not driven.

Where the result of the determination at Step S70 is YES, the ride control section 113 switches the ride control to the actuated state (Step S80). Specifically, commands for switching the first RC valve 59 and the second RC valve 63 (selector valve device) to the second positions R (first state) are output to the first RC valve 59 and the second RC valve 63. Moreover, the HRV cancellation valve 73 is controlled such that the function of the HR valve 56 is canceled. That is, a command for switching the HRV cancellation valve 73 to the second position C is output to the HRV cancellation valve 73. Thereby, the function of the HR valve 56 is forcibly canceled (the HR valve 56 opens), and the bidirectional flow between the bottom chamber Cb of the boom cylinder 45 and the accumulator 58 is permitted. In addition, the bidirectional flow between the rod chamber Cr of the boom cylinder 45 and the hydraulic working fluid tank 57 is permitted.

On the other hand, where the result of the determination at Step S40 is NO, that is, when it is determined that the ride control is being executed, the ride control section 113 determines whether the traveling speed Vt of the hydraulic excavator 1 satisfies a ride control stopping condition or not (Step S110). Where the traveling speed Vt satisfies the stopping condition (when a result of the determination is YES), the procedure proceeds to Step S90, at which the ride control is switched to the stopped state; in contrast, where the traveling speed Vt does not satisfy the stopping condition (when the result of the determination is NO), the procedure proceeds to Step S120.

Specifically, where the traveling speed Vt obtained by converting the sensing value received from the speed sensor 99 (the rotation speed V of the wheels 13 and 15) is equal to or lower than a second threshold V2 (when V≤V2), the result of determination is that the ride control stopping condition is satisfied (YES). Otherwise, the result of the determination is that the stopping condition is not satisfied (NO). For example, the second threshold V2 is a setting value which is a speed lower than the first threshold V1, which is a ride control execution condition. For example, as the second threshold V2, the setting value of 2 km/h is assumed.

Where the result of the determination at Step S110 is NO, the ride control section 113 determines whether a ride control stopping condition is satisfied or not on the basis of whether the front work implement 4 is being operated or not by the operation device 26 (Step S120). Similarly to the ride control second execution condition, the stopping condition is a determination condition for preventing the hydraulic fluid from the hydraulic pump 51 from flowing into the ride control hydraulic circuit due to operation of the front work implement 4 during actuation of the ride control. Where the front work implement 4 is being operated using the operation device 26 (when a result of the determination is YES), the procedure proceeds to Step S90, at which the ride control is switched to the stopped state; in contrast, where the front work implement 4 is not being operated using the operation device 26 (when the result of the determination is NO), the procedure proceeds to Step S80, at which the ride control is actuated.

Specifically, where the operation pilot pressure Pp output by the operation device 26, which is a sensing value by the second pressure sensor 97, is equal to or higher than a fourth threshold P4 (when Pp≥P4), it is determined that the front work implement 4 is being operated, and the ride control stopping condition is satisfied (YES). Otherwise, it is determined that the work implement 4 is not being operated, and the stopping condition is not satisfied (NO). The fourth threshold P4 is a setting value which is higher than the third threshold P3 of the ride control third execution condition.

The control to switch the ride control to the stopped state when the result of the determination at Step S120 is YES (Step S80) and the control of the actuated state of the ride control when the result of the determination at Step S120 is NO (Step S90) are similar to the control of the first RC valve 59, the second RC valve 63, and the HRV cancellation valve 73 mentioned above.

In this manner, for example, the hydraulic excavator 1 is configured to switch the ride control function to the actuated state and to the stopped state according to various situations even at the time when the ride control is enabled, using pressure sensing values of hydraulic cylinders such as the boom cylinder 45, an operation pilot pressure (operation pilot pressure Pp), a sensing value by the speed sensor, and the like. For example, where the vibration suppression instructing device (RC switch 31) is giving an instruction for enabling control of the vibration suppression function, the controller 100 performs control such that the selector valve device (the first RC valve 59 and the second RC valve 63) is in the first state (second positions R) or the second state (first positions S) on the basis of pressure sensing values of the hydraulic cylinders obtained by the pressure sensors, a sensing value by the operation sensor, and a sensing value by the speed sensor.

For example, in the present embodiment, where an instruction signal from the RC switch 31 is an instruction for enabling the control of the ride control by the controller 100, the controller 100 switches the ride control to either the actuated state or the stopped state by determining whether all the three ride control execution conditions are satisfied or not on the basis of the sensing value by the first pressure sensor 96 (boom bottom pressure Pb), the sensing value by the second pressure sensor 97 (the operation pilot pressure Pp of the operation device 26), and the sensing value by the speed sensor 99 (the rotation speed V of the wheels 13 and 15). Moreover, the controller 100 switches the ride control to either the actuated state or the stopped state on the basis of whether an instruction signal for the overload alert switch 32 is being given or not and the state (the locked state or the canceled state) of the axle lock (the locking mechanism such as the axle lock valve 78). In addition, where the ride control is in the actuated state, the controller 100 switches the ride control to either the actuated state or the stopped state by determining whether either of the two ride control stopping conditions is satisfied or not.

Next, actions of the hydraulic system in the first embodiment of the wheeled construction machine according to the present invention are explained. First, an action performed by the hydraulic system at the time of operation of the front work implement (boom) in a case where the RC switch of the hydraulic excavator is giving an instruction for disabling is explained using FIG. 3 and FIG. 5.

When boom raising operation is performed using the operation device 26 depicted in FIG. 3, an operation pilot pressure (boom raising command) generated by the operation device 26 drives corresponding control valves of the control valve unit 53. Thereby, the hydraulic fluid from the hydraulic pump 51 is supplied to the line connection chamber 86 of the HR valve 56 via the first actuator line 54. Thereby, the poppet valve 81 of the HR valve 56 opens. Accordingly, the hydraulic fluid from the hydraulic pump 51 is supplied from the line connection chamber 86 of the HR valve 56 through the cylinder connection chamber 87 to the bottom chamber Cb of the boom cylinder 45. At this time, the hydraulic working fluid in the rod chamber Cr of the boom cylinder 45 is discharged to the hydraulic working fluid tank 57 via the second actuator line 55 and the control valve unit 53. Thereby, the boom cylinder 45 is extended, and a boom raising action is performed.

When boom lowering operation is performed using the operation device 26, an operation pilot pressure (boom lowering command) of the operation device 26 drives corresponding control valves of the control valve unit 53. Thereby, the hydraulic fluid from the hydraulic pump 51 is supplied to the rod chamber Cr of the boom cylinder 45 via the second actuator line 55. At this time, the operation pilot pressure (boom lowering command) of the operation device 26 is input to the pressure-receiving section 82*a* of the pilot valve 82 of the HR valve 56 via the shuttle valve 74 as a cancellation pilot pressure. Note that, since the ride control is not executed due to an instruction for disabling from the RC switch 31, the cancellation pilot pressure of the HRV cancellation valve 73 is not output from the shuttle valve 74. In the HR valve 56, movement of the pilot valve 82 due to an input of the cancellation pilot pressure of the operation device 26 establishes communication between the line connection chamber 86 and the back pressure chamber 88, and opens the poppet valve 81. Thereby, the hydraulic fluid in the bottom chamber Cb of the boom cylinder 45 is discharged from the HR valve 56 to the hydraulic working fluid tank 57 via the first actuator line 54 and the control valve unit 53. Thereby, the boom cylinder 45 is retracted, and a boom lowering action is performed.

If, by any chance, the first actuator line 54 is ruptured at the time of boom raising operation, the pressure of the line connection chamber 86 of the HR valve 56 lowers to atmospheric pressure. On the other hand, a high load pressure of the bottom chamber Cb of the boom cylinder 45 has been introduced to the back pressure chamber 88 via the restrictor communication line 85*a*. Because of this, the poppet valve 81 closes immediately. Accordingly, the poppet valve 81 inhibits the hydraulic fluid from flowing out of the bottom chamber Cb of the boom cylinder 45 to the first actuator line 54, and the boom 41 is inhibited from falling.

Note that, when load hanging work by the front work implement 4 like the one depicted in FIG. 5 is to be performed, the axle lock is switched to the locked state. That is, the controller 100 (see FIG. 4) keeps the axle lock valve 78 at the first position L (lock position) by outputting an OFF signal to the axle lock valve 78. Thereby, the pilot check valve 67 functions as a check valve. Accordingly, extension and retraction of the ram cylinders 66 are inhibited, and oscillations of the axles 12 and 14 are restricted. Thereby, a situation where the swing body 3 becomes instable at the time of load hanging work is avoided.

Next, an action performed by the hydraulic system in a case where the RC switch of the hydraulic excavator is giving an instruction for enabling is explained using FIG. 3 to FIG. 7. It is supposed that the hydraulic excavator starts movement from a work site and travels on a public road.

An operator of the hydraulic excavator 1 switches on (enables) the RC switch 31 depicted in FIG. 4. In a case where an instruction from the RC switch 31 is for enabling, the controller 100 determines whether the overload alert switch 32 is turned on or not (Step S20 depicted in FIG. 6), and determines whether the axle lock is in the locked state or not (Step S30 depicted in FIG. 6).

Where hanging/traveling like the one depicted in FIG. 5 is to be performed, typically, the overload alert switch 32 is turned on, and the axle lock is in the locked state. Because of this, where hanging/traveling is performed, the controller 100 depicted in FIG. 4 determines results of the determinations at Steps S20 and S30 depicted in FIG. 6 as YES, and makes the ride control to be in the stopped state even in a case where an instruction from the RC switch 31 is for enabling the control of the ride control by the controller 100 (Step S90). That is, the controller 100 outputs OFF signals to the first RC valve 59 and the second RC valve 63, and outputs an OFF signal to the HRV cancellation valve 73.

Thereby, the first RC valve 59 and the second RC valve 63 depicted in FIG. 3 are kept at the first positions S (second state), and the HRV cancellation valve 73 is kept at the first position N (non-cancellation position). Accordingly, the flow from the bottom chamber Cb of the boom cylinder 45 to the accumulator 58 via the HR valve 56 is inhibited, and the flow from the rod chamber Cr of the boom cylinder 45 to the hydraulic working fluid tank 57 is inhibited. Moreover, the function of the HR valve 56 is maintained without being canceled. Because of this, even where the first actuator line 54 is ruptured during hanging/traveling, the HR valve 56 functions as mentioned before, and inhibits the hydraulic fluid from flowing out of the bottom chamber Cb of the boom cylinder 45. Accordingly, the boom 41 can be prevented from falling during the traveling.

In this manner, in the present embodiment, it is determined whether traveling of the hydraulic excavator 1 is hanging/traveling or not based on an instruction from the overload alert switch 32 and the state of the axle lock, and, when the traveling is hanging/traveling, the ride control is made to be in the stopped state even in a case where an instruction from the RC switch 31 is for enabling. Thereby, it is possible to prevent a vehicle body (swing body 3) from becoming instable due to execution of the ride control during hanging/traveling. In addition, since it is not necessary to operate the RC switch 31 to give an instruction for disabling the control of the ride control such that the ride control is not executed during hanging/traveling, the complexity of operation by an operator on the RC switch 31 can be reduced.

On the other hand, during normal traveling other than hanging/traveling, the controller 100 determines whether all the three ride control execution conditions are satisfied or not (Steps S50 to S70 depicted in FIG. 6). Since the front work implement 4 does not touch a ground, but is kept in the air during normal traveling, the boom bottom pressure Pb is made higher than the first threshold P1. Accordingly, the controller 100 determines that the first execution condition of the boom bottom pressure Pb is satisfied (YES at Step S50 depicted in FIG. 6). When the hydraulic excavator 1 reaches the traveling state where the hydraulic excavator 1 travels at a speed faster than the speed V1, which is the first threshold, it is determined that the second execution condition of the traveling speed Vt is satisfied (YES at Step S60 depicted in FIG. 6).

Where the operation device 26 is being operated during traveling, it is determined that the third execution condition of the operation pilot pressure Pp is not satisfied (NO at Step S70 depicted in FIG. 6), and an command for making the ride control be in the stopped state is output even if an instruction from the RC switch 31 is for enabling (Step S90 depicted in FIG. 6). Thereby, the high-pressure hydraulic fluid from the hydraulic pump 51 is prevented from flowing into hydraulic circuits related to the ride control (the hydraulic circuit connecting the bottom chamber Cb of the boom cylinder 45 and the accumulator 58, etc.).

On the other hand, where the hydraulic excavator 1 travels in a state where the front work implement 4 is kept in the stopped state, it is determined that the third execution condition of the operation pilot pressure Pp is satisfied (YES at Step S70 depicted in FIG. 6), and a command for making the ride control be in the actuated state is output in accordance with an instruction for enabling from the RC switch 31 (Step S80 depicted in FIG. 6). That is, the controller 100 outputs an ON signal to the HRV cancellation valve 73 depicted in FIG. 3, and outputs ON signals to the first RC valve 59 and the second RC valve 63. Thereby, the HR valve 56 opens, permits the bidirectional flow between the bottom chamber Cb of the boom cylinder 45 and the accumulator 58, and permits the bidirectional flow between the rod chamber Cr of the boom cylinder 45 and the hydraulic working fluid tank 57. Accordingly, even if the front work implement 4 vibrates during traveling, the accumulator 58 absorbs the vibration energy. Accordingly, pitching and bouncing of the swing body 3 due to motions of the front work implement 4 can be reduced.

Where the ride control is actuated in this manner, the controller 100 determines whether the ride control stopping conditions are satisfied or not (from a NO determination at Step S40 to S110 and S120 depicted in FIG. 6). When the front work implement 4 is operated during actuation of the ride control, it is determined that the stopping condition of the operation pilot pressure Pp is satisfied (YES at Step S120 depicted in FIG. 6), and the ride control is switched to the stopped state. In addition, when the traveling speed Vt of the hydraulic excavator 1 lowers to the speed V2, which is the second threshold, it is determined that the stopping condition of the traveling speed Vt is satisfied (YES at Step S110 depicted in FIG. 6), and a command for making the ride control be in the stopped state is output.

In addition, where the hydraulic excavator 1 moves from a work site to a public road, the hydraulic excavator 1 drops mud adhered to the wheels before moving to the public road in some cases. For example, an operator temporarily stops the hydraulic excavator 1 having been caused to travel in a state where the RC switch 31 is turned on. Due to the stopping of the traveling, the ride control is in the stopped state. Then, the jack-up action depicted in FIG. 7 is performed, and the wheels 13 and 15 are caused to rotate idly in the jacked-up state. In this case, since the bucket 43 of the front work implement 4 is caused to touch a ground due to the jack-up action, the boom bottom pressure Pb has become lower than the first threshold P1.

At this time, since the RC switch 31 is turned on (an instruction for enabling), and the ride control is in the stopped state, the controller 100 determines whether the three ride control execution conditions are satisfied or not (Steps S50 to S70 depicted in FIG. 6). Even where the traveling speed Vt obtained by converting the speed V of the idly rotating wheels 13 and 15 is equal to or more than the first threshold V1, and the front work implement 4 is not being operated, the boom bottom pressure Pb has become lower than the first threshold P1. Accordingly, it is determined that the first execution condition of the boom bottom pressure Pb is not satisfied (NO at Step S50 depicted in FIG. 6). Accordingly, the controller 100 maintains the ride control at the stopped state.

If the ride control is actuated undesirably due to the wheels 13 and 15 that are caused to idly rotate during the jack-up action, the hydraulic fluid in the rod chamber Cr of the boom cylinder 45 flows out to the hydraulic working fluid tank 57 via the second RC valve 63 due to the load of the jack-up action. Accordingly, it becomes not possible to maintain the jack-up action. In view of this, in the present embodiment, taking into consideration that the boom bottom pressure Pb lowers during the jack-up action than that during traveling, the boom bottom pressure Pb is used as one of the ride control execution conditions. Thereby, even if the RC switch 31 is kept turned on (an instruction for enabling), the ride control is not actuated during the jack-up action. Accordingly, it is not necessary to perform switching operation to turn off (disabled) the RC switch 31 having been turned on (enabled), such that the ride control is not actuated when the wheels 13 and 15 are caused to rotate idly in the jacked-up state. Stated differently, the controller 100 disables the control of the vibration suppression function even in a case where the vibration suppression instructing device (RC switch 31) is giving an instruction for enabling the control of the vibration suppression function, in a state where the vehicle body 2, 3 are being jacked up by the front work implement 4.

As mentioned above, the wheeled hydraulic excavator 1 (wheeled construction machine) according to the first embodiment includes: the travelable vehicle body 2, 3 equipped with the wheels 13 and 15; the front work implement 4 (work implement) attached to the vehicle body 2, 3; the controller 100 that executes the control of the vibration suppression function to control the flow of the hydraulic fluid from the hydraulic cylinders (the boom cylinder 45, the arm cylinder 46, and the bucket cylinder 47) that drive the front work implement 4 (work implement), thereby suppressing vibrations of the hydraulic cylinders (the boom cylinder 45, the arm cylinder 46, and the bucket cylinder 47) when the rotation speeds of the wheels 13 and 15 reaches a predetermined speed or higher; and the RC switch 31 as the vibration suppression instructing device that gives instructions for enabling and disabling the control of the vibration suppression function by the controller 100. The controller 100 disables the control of the vibration suppression function when the vehicle body 2, 3 is jacked up by the front work implement 4 (work implement), even when the RC switch 31 (vibration suppression instructing device) has given the instruction for enabling the control of the vibration suppression function.

According to this configuration, even when the RC switch 31 (vibration suppression instructing device) has given the instruction for enabling the control of the vibration suppression function, the control of the vibration suppression function is disabled in a state where the vehicle body 2, 3 is being jacked up by the front work implement 4 (work implement). Accordingly, it becomes unnecessary for an operator to perform operation for giving the instruction for disabling the control of the vibration suppression function to the RC switch 31 (vibration suppression instructing device). That is, the cumbersomeness of operation of the RC switch 31 (vibration suppression instructing device) can be reduced.

In addition, the wheeled hydraulic excavator 1 (wheeled construction machine) according to the present embodiment includes: the hydraulic pump 51 that supplies the hydraulic fluid to the hydraulic cylinders (the boom cylinder 45, the arm cylinder 46, and the bucket cylinder 47); the accumulator 58 that is provided on the hydraulic line (first actuator line 54) between the hydraulic pump 51 and the hydraulic cylinder (boom cylinder 45), and absorbs pressure variation of the hydraulic cylinder (boom cylinder 45); the first RC valve 59 and the second RC valve 63 as the selector valve device that is switched to be in the first state where the selector valve device permits the flow of the hydraulic fluid from the hydraulic cylinder (boom cylinder 45) to the accumulator 58 and permits the flow of the hydraulic fluid from the hydraulic cylinder (boom cylinder 45) to the hydraulic working fluid tank 57 (tank) to actuate the vibration suppression function, or the second state where the selector valve device interrupts the flow of the hydraulic fluid from the hydraulic cylinder (boom cylinder 45) to the accumulator 58 and interrupts the flow of the hydraulic fluid from the hydraulic cylinder (boom cylinder 45) to the hydraulic working fluid tank 57 (tank) to stop the vibration suppression function; the operation device 26 that outputs an operation instruction for the front work implement 4 (work implement); the first pressure sensor 96 that senses the pressure of the boom cylinder 45 (hydraulic cylinder); the second pressure sensor 97 as an operation sensor that senses the operation instruction from the operation device 26; and the speed sensor 99 that senses the rotation speeds of the wheels 13 and 15. The controller 100 controls the first RC valve 59 and the second RC valve 63 (selector valve device) to be at the second positions R (first state) or the first positions S (second state) based on the sensing value Pb by the first pressure sensor 96, the sensing value Pp by the second pressure sensor 97 (operation sensor), and the sensing value V by the speed sensor 99, when the RC switch 31 (vibration suppression instructing device) gives the instruction for enabling the control of the vibration suppression function.

According to this configuration, the pressure value (boom bottom pressure Pb) of the boom cylinder 45 (hydraulic cylinder) sensed by the first pressure sensor 96 is used in addition to the sensing value Pp by the second pressure sensor 97 (operation sensor) and the sensing value V by the speed sensor 99 as execution conditions of the vibration suppression function by the accumulator 58. Thus, it is possible to specify whether the vibration suppression function is allowed to be switched to the actuated state according to whether the jack-up action using the front work implement 4 (work implement) is being performed or not. Accordingly, it is possible to make it unnecessary to perform operation to switch the RC switch 31 (vibration suppression instructing device) to give the instruction for disabling in order to prevent the vibration suppression function from being switched to the actuated state, in a case where the jack-up action is to be performed when the RC switch 31 (vibration suppression instructing device) has been operated to give the instruction for enabling. That is, the cumbersomeness of operation of the RC switch 31 (vibration suppression instructing device) can be reduced.

In addition, in the present embodiment, the work implement includes the boom 41, the arm 42, and the bucket 43. The hydraulic cylinder is the boom cylinder 45 that moves the boom 41 in the upward direction when the hydraulic fluid is supplied to the bottom chamber Cb, and moves the boom 41 in the downward direction when the hydraulic fluid is supplied to the rod chamber Cr. The first pressure sensor 96 senses the pressure of the bottom chamber Cb of the boom cylinder 45. The controller 100 controls the first RC valve 59 and the second RC valve 63 (selector valve device) to be at the second positions R (first state) or the first positions S (second state) if the sensing value by the first pressure sensor 96 (boom bottom pressure Pb) is lower than the preset first threshold P1, when the RC switch 31 (vibration suppression instructing device) gives the instruction for enabling the control of the vibration suppression function.

According to this configuration, the vibration suppression function can be made surely to be in the stopped state when the hydraulic excavator 1 is being jacked up.

In addition, the controller 100 of the present embodiment is configured to control the first RC valve 59 and the second RC valve 63 (selector valve device) based on the sensing value V by the speed sensor 99 and the sensing value Pp by the second pressure sensor 97 (operation sensor) independently of the sensing value by the first pressure sensor 96 (boom bottom pressure Pb) when the first RC valve 59 and the second RC valve 63 (selector valve device) are being controlled such that the vibration suppression function described above is in the actuated state.

According to this configuration, it is possible to avoid a situation where the vibration suppression function is wastefully stopped even if the boom bottom pressure Pb lowers during actuation of the vibration suppression function. When the front work implement 4 vibrates in the upward direction during actuation of the vibration suppression function, the boom bottom pressure Pb lowers temporarily and then the hydraulic fluid flows into the bottom chamber Cb of the boom cylinder 45. Because of this, the boom bottom pressure Pb becomes lower than the first threshold P1 in some cases. At this time, if the vibration suppression function is stopped, it becomes not possible for the vibration suppression function to work effectively, undesirably. Accordingly, such switching of the vibration suppression function to the stopped state is prevented.

In addition, the wheeled hydraulic excavator 1 (wheeled construction machine) of the present embodiment includes: the axles 12 and 14 that rotatably support the wheels 13 and 15, and is capable of oscillating relative to the vehicle body 2, 3; and the locking mechanism 67, 78 that disables oscillations of the axles 12 and 14. The locking mechanism 67, 78 is controlled to be switched to either the locked state or the canceled state. In addition, the controller 100 controls the first RC valve 59 and the second RC valve 63 (selector valve device) to be at the second positions R (first state) or the first positions S (second state) based on the state of the locking mechanism 67, 78 in addition to the sensing value Pb by the first pressure sensor 96, the sensing value Pp by the second pressure sensor 97 (operation sensor), and the sensing value V by the speed sensor 99, when the RC switch 31 (vibration suppression instructing device) gives the instruction for enabling the control of the vibration suppression function.

According to this configuration, the vibration suppression function is made in the stopped state when the locking mechanism 67, 78 that is actuated during hanging/traveling is in the locked state. This can prevent instability of the swing body 3 (vehicle body) that is produced due to actuation of the vibration suppression function during hanging/traveling. Stated differently, it is not necessary to perform operation to switch instructions of the RC switch 31 (vibration suppression instructing device) from one for enabling to one for disabling in order to prevent instability of the swing body 3 (vehicle body) that is produced due to actuation of the vibration suppression function during hanging/traveling. That is, the cumbersomeness of operation of the RC switch 31 (vibration suppression instructing device) can be reduced.

In addition, the wheeled hydraulic excavator 1 (wheeled construction machine) of the present embodiment includes the overload alert switch 32 as the overload alert instructing device that gives an instruction for the overload alert control to generate an alert when the load of load hanging work by the front work implement 4 (work implement) is excessively large. In addition, the controller 100 controls the first RC valve 59 and the second RC valve 63 (selector valve device) to be at the second positions R (first state) or the first positions S (second state) based on a presence or absence of the instruction for the overload alert control from the overload alert switch 32 (overload alert instructing device) in addition to the sensing value Pb by the first pressure sensor 96, the sensing value Pp by the second pressure sensor 97 (operation sensor), and the sensing value V by the speed sensor 99, when the RC switch 31 (vibration suppression instructing device) gives the instruction for enabling the control of the vibration suppression function.

According to this configuration, the vibration suppression function is made in the stopped state when the overload alert switch 32 (overload alert instructing device) that is operated during hanging/traveling gives an instruction. This can prevent instability of the swing body 3 (vehicle body) that is produced due to actuation of the vibration suppression function during hanging/traveling. Stated differently, it is not necessary to perform operation to switch instructions of the RC switch 31 (vibration suppression instructing device) from one for enabling to one for disabling in order to prevent instability of the swing body 3 (vehicle body) that is produced due to actuation of the vibration suppression function during hanging/traveling. That is, the cumbersomeness of operation of the RC switch 31 (vibration suppression instructing device) can be reduced.

In addition, the wheeled hydraulic excavator 1 (wheeled construction machine) of the present embodiment includes: the hose rupture valve 56 that is installed on the first actuator line 54 (hydraulic line), and has a function to prevent the hydraulic fluid from flowing out of the boom cylinder 45 (hydraulic cylinder) to the first actuator line 54 (hydraulic line) when the first actuator line 54 (hydraulic line) is ruptured; and the HRV cancellation valve 73 (cancellation valve) capable of switching between maintaining and cancelling the function of the hose rupture valve 56. The accumulator 58 is connected to the boom cylinder 45 (hydraulic cylinder) via the hose rupture valve 56. In addition, the controller 100 is configured to control the HRV cancellation valve 73 (cancellation valve) in addition to the first RC valve 59 and the second RC valve 63 (selector valve device). The controller 100 controls the HRV cancellation valve 73 (cancellation valve) such that the function of the hose rupture valve 56 is canceled when controlling the first RC valve 59 and the second RC valve 63 (selector valve device) to be at the second positions R (first state), and controls the HRV cancellation valve 73 (cancellation valve) such that the function of the hose rupture valve 56 is maintained when controlling the first RC valve 59 and the second RC valve 63 (selector valve device) to be at the first positions S (second state).

According to this configuration, it is possible to activate the vibration suppression function described above by canceling the function of the hose rupture valve 56 using the HRV cancellation valve 73 (cancellation valve) even in a configuration in which the hose rupture valve 56 is installed for the boom cylinder 45 (hydraulic cylinder) to which the weight of the front work implement 4 is applied.

Second Embodiment

Figure 8:
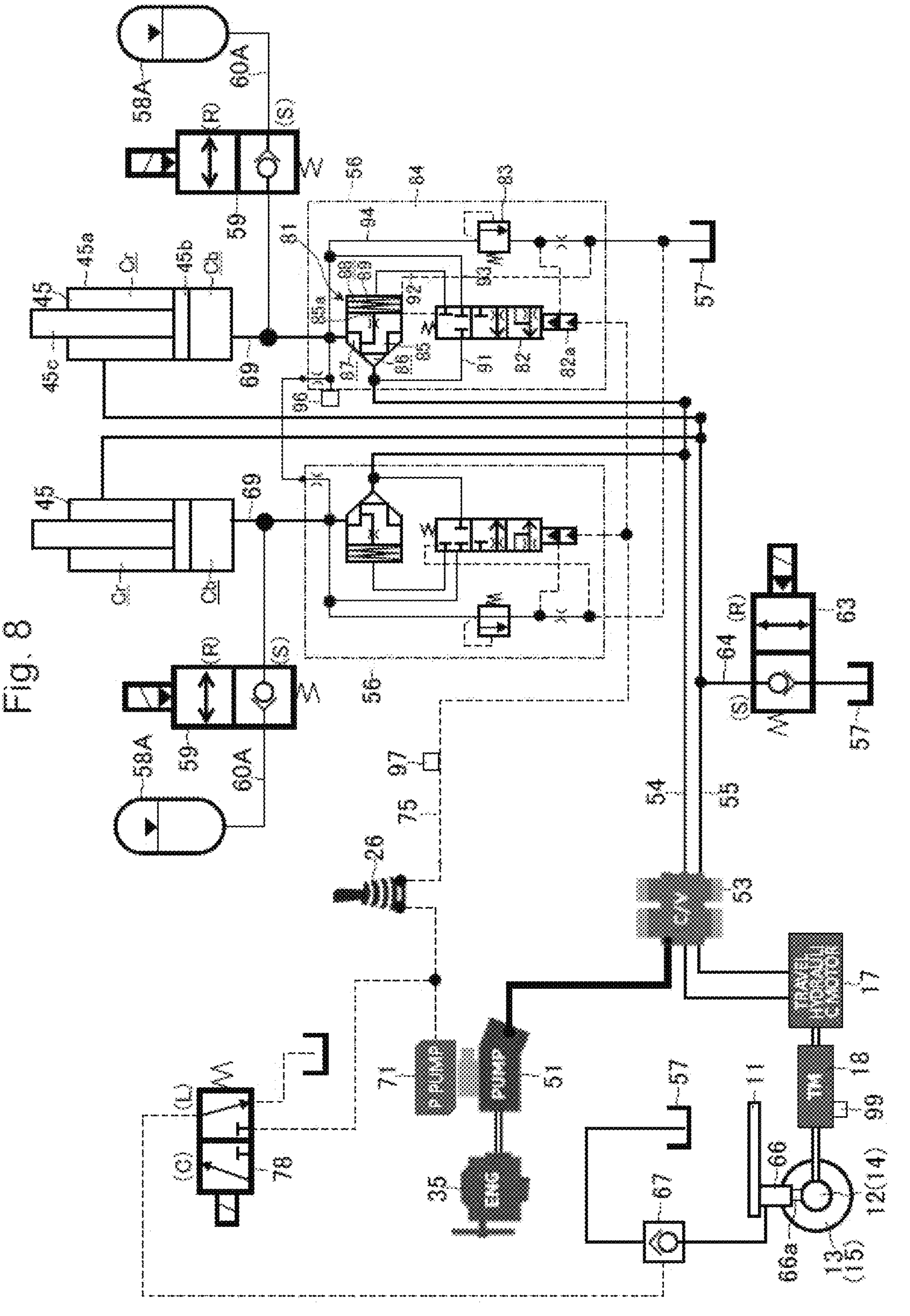
FIG. 8 is a circuit diagram depicting a schematic configuration of a hydraulic system and a block diagram depicting a schematic configuration of a travel system in a wheeled construction machine according to a second embodiment of the present invention.

Next, a wheeled construction machine according to a second embodiment of the present invention is explained using FIG. 8. FIG. 8 is a circuit diagram depicting a schematic configuration of a hydraulic system of the wheeled construction machine according to the second embodiment of the present invention, and a block diagram depicting a schematic configuration of a travel system of the wheeled construction machine. Note that those in FIG. 8 denoted with reference signs which are the same as reference signs depicted in FIG. 1 to FIG. 7 are similar parts, and accordingly detailed explanations thereof are omitted.

Major differences of the second embodiment of the wheeled construction machine according to the present invention depicted in FIG. 8 from the first embodiment are the following three. First, an accumulator 58A is connected to the bottom chamber Cb of the boom cylinder 45 via the first RC valve 59 bypassing the HR valve 56. Second, the ride control relief valve 61 in the first embodiment is deleted (see FIG. 3). Third, the HRV cancellation valve 73 in the first embodiment is deleted (see FIG. 3).

Specifically, the bottom chamber Cb of the boom cylinder 45 and the cylinder connection chamber 87 of the HR valve 56 are connected to each other via a third connection line 69. The accumulator 58A is connected to the third connection line 69 via a first connection line 60A. That is, the accumulator 58A is connected to the bottom chamber Cb of the boom cylinder 45 bypassing the HR valve 56. Because of this, it is possible to establish communication between the accumulator 58A and the bottom chamber Cb of the boom cylinder 45, and actuate the ride control only by switching the first RC valve 59, without canceling the function of the HR valve 56. Note that by increasing the withstanding pressure of the accumulator 58A, the ride control relief valve 61 in the first embodiment becomes unnecessary.

In the present embodiment, it is not necessary to cancel the function of the HR valve 56 for actuating the ride control. Accordingly, a configuration for canceling the function of the HR valve 56 during execution of the ride control in the first embodiment becomes unnecessary. That is, the HRV cancellation valve 73, the shuttle valve 74, the second pilot line 76, and the third pressure sensor 98 in the first embodiment are deleted.

The controller 100 according to the present embodiment is configured to control only the first RC valve 59 and the second RC valve 63 to execute the ride control that suppresses vibrations during traveling (at the time when the rotation speeds of the wheels 13 and 15 reach a predetermined speed or higher) by the accumulator 58A. That is, the controller according to the present embodiment has a configuration obtained by deleting an input of a sensing value from the third pressure sensor 98, and deleting an output of a command to the HRV cancellation valve 73 in the controller 100 according to the first embodiment depicted in FIG. 4. That is, the controller according to the present embodiment is different from the procedure of the ride control section 113 depicted in FIG. 6 only in terms of a processing method regarding the actuated state or the stopped state of the ride control at Steps S80 and S90. In other respects, the determinations regarding execution conditions of the ride control and the determinations regarding stopping conditions of the ride control at Steps S10 to S70 are completely the same.

According to the second embodiment of the wheeled construction machine according to the present invention mentioned above, similarly to the first embodiment mentioned before, even when the RC switch 31 (vibration suppression instructing device) has given the instruction for enabling the control of the vibration suppression function, the control of the vibration suppression function is disabled in a state where the vehicle body 2, 3 are being jacked up by the front work implement 4 (work implement). Accordingly, it becomes unnecessary for an operator to perform operation for giving the instruction for disabling the control of the vibration suppression function to the RC switch 31 (vibration suppression instructing device). That is, the cumbersomeness of operation of the RC switch 31 (vibration suppression instructing device) can be reduced.

Other Embodiments

Note that the present invention is not limited to the embodiments mentioned above, but includes various modification examples. The embodiments described above are explained in detail for explaining the present invention in an easy-to-understand manner, and the present invention is not necessarily limited to those including all constituent elements explained. For example, it is possible to replace some of the constituent elements of an embodiment with constituent elements of another embodiment, and it is also possible to add constituent elements of an embodiment to the constituent elements of another embodiment. In addition, regarding some of the constituent elements of each embodiment, addition or deletion of, or replacement with the other constituent elements is possible.

For example, whereas the wheeled hydraulic excavator 1 is explained as an exemplary wheeled construction machine in the embodiments mentioned above, the present invention can be applied widely to wheeled construction machines including work implements such as wheel loaders.

In addition, the embodiments mentioned above depict examples of configurations in which at least either of the axles 12 and 14 is oscillatably attached to the frame 11, and the locking mechanism 66, 67, 78 that disables oscillations of the axles 12 and 14 is included. However, both the axles 12 and 14 are fixed to the frame 11, in another possible configuration. In this case, the determination at Step S30 related to the axle lock is deleted from the procedure performed by the ride control section 113 of the controller 100 depicted in FIG. 6.

In addition, the embodiments mentioned above depict examples of configurations in which the operation device 26 that outputs an operation instruction for the front work implement 4 generates the operation pilot pressure of the control valve unit 53, and generates the cancellation pilot pressure of the HR valve 56. However, the operation device is configured as an electric operating device, and solenoid proportional valves generate the operation pilot pressures of the control valve unit 53, and generates the cancellation pilot pressure of the HR valve 56, using the delivery pressure of the pilot pump 71 as the source pressure, in a possible configuration. In this case, the controller controls the solenoid proportional valves in response to an operation signal of the electric operation device, thereby generating the operation pilot pressure and the cancellation pilot pressure. At this time, an operation sensor that senses an operation instruction from the operation device can be configured using the operation device itself that outputs the operation signal to the controller 100.

In addition, the embodiments mentioned above depict examples in which the controller 100 that performs the ride control is configured to perform the switching control of the axle lock. However, there may be a discrete controller that performs the switching control of the axle lock, and the discrete controller 100 that performs the ride control, in another possible configuration.

DESCRIPTION OF REFERENCE CHARACTERS

1: Wheeled hydraulic excavator (wheeled construction machine)
2: Travel body (vehicle body)
3: Swing body (vehicle body)
4: Front work implement (work implement)
12, 14: Axle
13: Front wheel (wheel)
15: Rear wheel (wheel)
26: Operation device
31: Ride control switch (vibration suppression instructing device)
32: Overload alert switch (overload alert instructing device)
43: Boom
44: Arm
45: Bucket
45: Boom cylinder (hydraulic cylinder)
Cb: Bottom chamber
Cr: Rod chamber
51: Hydraulic pump
54: First actuator line (hydraulic line)
56: Hose rupture valve
57: Hydraulic working fluid tank (tank)
58, 58A: Accumulator
59: First ride control valve (selector valve device)
63: Second ride control valve (selector valve device)
66: Ram cylinder (locking mechanism)
67: Pilot check valve (locking mechanism)
73: Hose rupture valve cancellation valve (cancellation valve)
78: Axle lock valve (locking mechanism)
96: First pressure sensor (pressure sensor)
97: Second pressure sensor (operation sensor)
99: Speed sensor
100: Controller

The invention claimed is:

1. A wheeled construction machine comprising:
a travelable vehicle body equipped with a wheel;
a work implement attached to the vehicle body;
a controller that executes control of a vibration suppression function to control a flow of a hydraulic fluid from a hydraulic cylinder that drives the work implement, thereby suppressing vibration of the hydraulic cylinder when a rotation speed of the wheel reaches a predetermined speed or higher; and
a vibration suppression instructing device that gives an instruction for enabling or disabling the control of the vibration suppression function by the controller, wherein
the controller is configured to disable the control of the vibration suppression function when the vehicle body is jacked up by the work implement, even when the vibration suppression instructing device has given an instruction for enabling the control of the vibration suppression function.

2. The wheeled construction machine according to claim 1, wherein
the wheeled construction machine includes
a hydraulic pump that supplies the hydraulic fluid to the hydraulic cylinder,
an accumulator that is provided on a hydraulic line between the hydraulic pump and the hydraulic cylinder, and absorbs pressure variation of the hydraulic cylinder,
a selector valve device that is switched to be in a first state or a second state, the first state being a state where the selector valve device permits the flow of the hydraulic fluid from the hydraulic cylinder to the accumulator and permits the flow of the hydraulic fluid from the hydraulic cylinder to a tank to actuate the vibration suppression function, the second state being a state where the selector valve device interrupts the flow of the hydraulic fluid from the hydraulic cylinder to the accumulator and interrupts the flow of the hydraulic fluid from the hydraulic cylinder to the tank to stop the vibration suppression function;
an operation device that outputs an operation instruction for the work implement,
a pressure sensor that senses a pressure of the hydraulic cylinder,
an operation sensor that senses the operation instruction from the operation device, and
a speed sensor that senses a rotation speed of the wheel, and
the controller is configured to control the selector valve device to be in the first state or the second state based on a sensing value by the pressure sensor, a sensing value by the operation sensor, and a sensing value by the speed sensor, when the vibration suppression instructing device gives the instruction for enabling the control of the vibration suppression function.

3. The wheeled construction machine according to claim 2, wherein
the work implement includes a boom, an arm, and a bucket,
the hydraulic cylinder is a boom cylinder that moves the boom in an upward direction when the hydraulic fluid is supplied to a bottom chamber of the boom cylinder, and moves the boom in a downward direction when the hydraulic fluid is supplied to a rod chamber of the boom cylinder,
the pressure sensor senses a pressure of the bottom chamber of the boom cylinder, and
the controller is configured to control the selector valve device to be in the second state if the sensing value by the pressure sensor is lower than a preset threshold, when the vibration suppression instructing device gives the instruction for enabling the control of the vibration suppression function.

4. The wheeled construction machine according to claim 2, wherein
the wheeled construction machine includes
an axle that rotatably supports the wheel, and is capable of oscillating relative to the vehicle body, and a locking mechanism that disables an oscillation of the axle, the locking mechanism is controlled to be switched to either a locked state or a canceled state, and the controller is configured to control the selector valve device to be in the first state or the second state based on a state of the locking mechanism in addition to the sensing value by the pressure sensor, the sensing value by the operation sensor, and the sensing value by the speed sensor, when the vibration suppression instructing device gives the instruction for enabling the control of the vibration suppression function.

5. The wheeled construction machine according to claim 2, wherein the wheeled construction machine includes an overload alert instructing device that gives an instruction for overload alert control to generate an alert when a load of load hanging work by the work implement is excessively large, and the controller is configured to control the selector valve device to be in the first state or the second state based on a presence or absence of the instruction for the overload alert control from the overload alert instructing device in addition to the sensing value by the pressure sensor, the sensing value by the operation sensor, and the sensing value by the speed sensor, when the vibration suppression instructing device gives the instruction for enabling the control of the vibration suppression function.

6. The wheeled construction machine according to claim 2, wherein the wheeled construction machine includes a hose rupture valve that is installed on the hydraulic line, and has a function to prevent the hydraulic fluid from flowing out of the hydraulic cylinder to the hydraulic line when the hydraulic line is ruptured, and a cancellation valve capable of switching between maintaining and cancelling the function of the hose rupture valve, the accumulator is connected to the hydraulic cylinder via the hose rupture valve, the controller is configured to control the cancellation valve in addition to the selector valve device, and the controller is configured to control the cancellation valve such that the function of the hose rupture valve is canceled, when controlling the selector valve device to be in the first state, and control the cancellation valve such that the function of the hose rupture valve is maintained, when controlling the selector valve device to be in the second state.

* * * * *